United States Patent
Nakashima et al.

(10) Patent No.: US 9,632,809 B2
(45) Date of Patent: Apr. 25, 2017

(54) MIGRATION BETWEEN VIRTUAL MACHINES

(71) Applicant: FUJITSU LIMITED, Kawasaki-shi, Kanagawa (JP)

(72) Inventors: Yoshiyuki Nakashima, Kawasaki (JP); Atsuko Mori, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 173 days.

(21) Appl. No.: 14/277,344

(22) Filed: May 14, 2014

(65) Prior Publication Data
US 2014/0359616 A1 Dec. 4, 2014

(30) Foreign Application Priority Data
May 30, 2013 (JP) ................................ 2013-113638

(51) Int. Cl.
*G06F 9/455* (2006.01)
(52) U.S. Cl.
CPC ................................ *G06F 9/45558* (2013.01)
(58) Field of Classification Search
None
See application file for complete search history.

(56) References Cited

U.S. PATENT DOCUMENTS

| | | | | |
|---|---|---|---|---|
| 8,230,069 B2* | 7/2012 | Korupolu | ............ | H04L 67/1097 709/226 |
| 8,250,574 B2* | 8/2012 | Baba | ....................... | G06F 9/505 718/1 |
| 8,311,032 B2* | 11/2012 | Smith | ................. | H04L 43/0852 370/351 |
| 8,386,610 B2* | 2/2013 | Yahalom | ............... | G06F 3/0605 709/226 |
| 8,429,630 B2* | 4/2013 | Nickolov | .............. | G06F 9/4856 717/110 |
| 8,751,627 B2* | 6/2014 | Liu | ........................ | G06F 9/5088 709/223 |
| 9,075,648 B2* | 7/2015 | Kruglick | ............. | H04L 43/0852 |

(Continued)

FOREIGN PATENT DOCUMENTS

| | | |
|---|---|---|
| CN | 1615635 | 5/2005 |
| JP | 2004-7578 | 1/2004 |

(Continued)

OTHER PUBLICATIONS

Li et al. "HyperMIP: Hypervisor controlled Mobile IP for Virtual Machine Live Migration across Networks", 2008 IEEE, pp. 80-88.*

(Continued)

*Primary Examiner* — Van Nguyen
(74) *Attorney, Agent, or Firm* — Fujitsu Patent Center

(57) ABSTRACT

A virtual-machine managing apparatus includes a delay storage unit that stores delay times between a plurality of managers managing a virtual machine; a route extractor that extracts a migration route from a source manager to a target manager based on the delay times between the managers stored in the delay storage unit such that the delay times between the managers are equal to or shorter than a threshold; and a migration controller that migrates the virtual machine from the source manager to the target manager through the migration route while maintaining the operation of the virtual machine.

6 Claims, 20 Drawing Sheets

(56) References Cited

U.S. PATENT DOCUMENTS

| 9,110,730 B2* | 8/2015 | Yamashita ............ G06F 9/5077 |
| 9,223,634 B2* | 12/2015 | Chang ................... G06F 9/5077 |
| 2005/0020265 A1 | 1/2005 | Funabiki et al. |
| 2010/0005465 A1 | 1/2010 | Kawato |
| 2010/0175070 A1* | 7/2010 | Baba ....................... G06F 9/505 |
| | | 718/105 |
| 2011/0110336 A1 | 5/2011 | Takamura |
| 2012/0137285 A1 | 5/2012 | Glikson et al. |
| 2012/0246282 A1 | 9/2012 | Oguchi |

FOREIGN PATENT DOCUMENTS

| JP | 2011-18106 | 1/2011 |
| JP | 2011-103567 | 5/2011 |
| JP | 2012-118980 | 6/2012 |
| JP | 2012-199838 | 10/2012 |
| WO | 2008-062864 | 5/2008 |

OTHER PUBLICATIONS

Huang et al. "High Performance Virtual Machine Migration with RDMA over Modern Interconnects", 2007 IEEE, pp. 11-20.*
Ma et al. "ME2: Efficient Live Migration of Virtual Machine With Memory Exploration and Encoding", 2012 IEEE, pp. 610-613.*
JPOA—Office Action mailed Nov. 29, 2016 issued for Japanese Patent Application No. 2013-113638, with partial English translation.
CNOA—Notification of the First Office Action for Chinese Patent Application No. 201410231186.1 dated Jan. 18, 2017, with English translation.

* cited by examiner

FIG. 5

| Site ID | Site Name | GW IP |
|---|---|---|
| S0001 | Site A | A.A.A.1 |
| S0002 | Site B | B.B.B.1 |
| S0003 | Site C | C.C.C.1 |

| HV ID | HV Name | HV IP | Site ID | Latency | Latest |
|---|---|---|---|---|---|
| H0001 | HV-A1 | A.A.A.11 | S0001 | 0 | 2012-1001-1700 |
| H0002 | HV-A2 | A.A.A.12 | S0001 | 0 | 2012-1001-1700 |
| H0003 | HV-B1 | B.B.B.11 | S0002 | 0 | 2012-1001-1700 |
| H0004 | HV-B2 | B.B.B.12 | S0002 | 1 | 2012-1001-1700 |
| H0005 | HV-C1 | C.C.C.11 | S0003 | 0 | 2012-1001-1700 |

| VM ID | VM Name | CPU | Mem | HDD | NIC | NW-Name | HV ID |
|---|---|---|---|---|---|---|---|
| V0001 | VM-A1-1 | 10% | 2GB | 30GB | 1 | VM Network | H0001 |
| V0002 | VM-A2-1 | | | | | | H0001 |
| V0003 | VM-A2-2 | | | | | | H0001 |
| V0004 | VM-B1-1 | | | | | | H0002 |
| V0005 | VM-B2-1 | | | | | | H0002 |
| V0006 | VM-B2-2 | | | | | | H0002 |

| DST Site ID | Latency | Latest |
|---|---|---|
| S0002 | 1 | 2012-1001-1700 |
| S0003 | 1 | 2012-1001-1700 |
| S0004 | 2 | 2012-1001-1700 |

| HV ID | CPU | Mem | HDD | NIC | Latest |
|---|---|---|---|---|---|
| H0001 | 20% | 32GB | 2TB | 4 | 2012-1001-1700 |
| H0002 | | | | | 2012-1001-1700 |
| H0003 | | | | | 2012-1001-1700 |
| H0004 | | | | | 2012-1001-1700 |
| H0005 | | | | | 2012-1001-1700 |

551, 552, 553, 554, 555, 556, 55

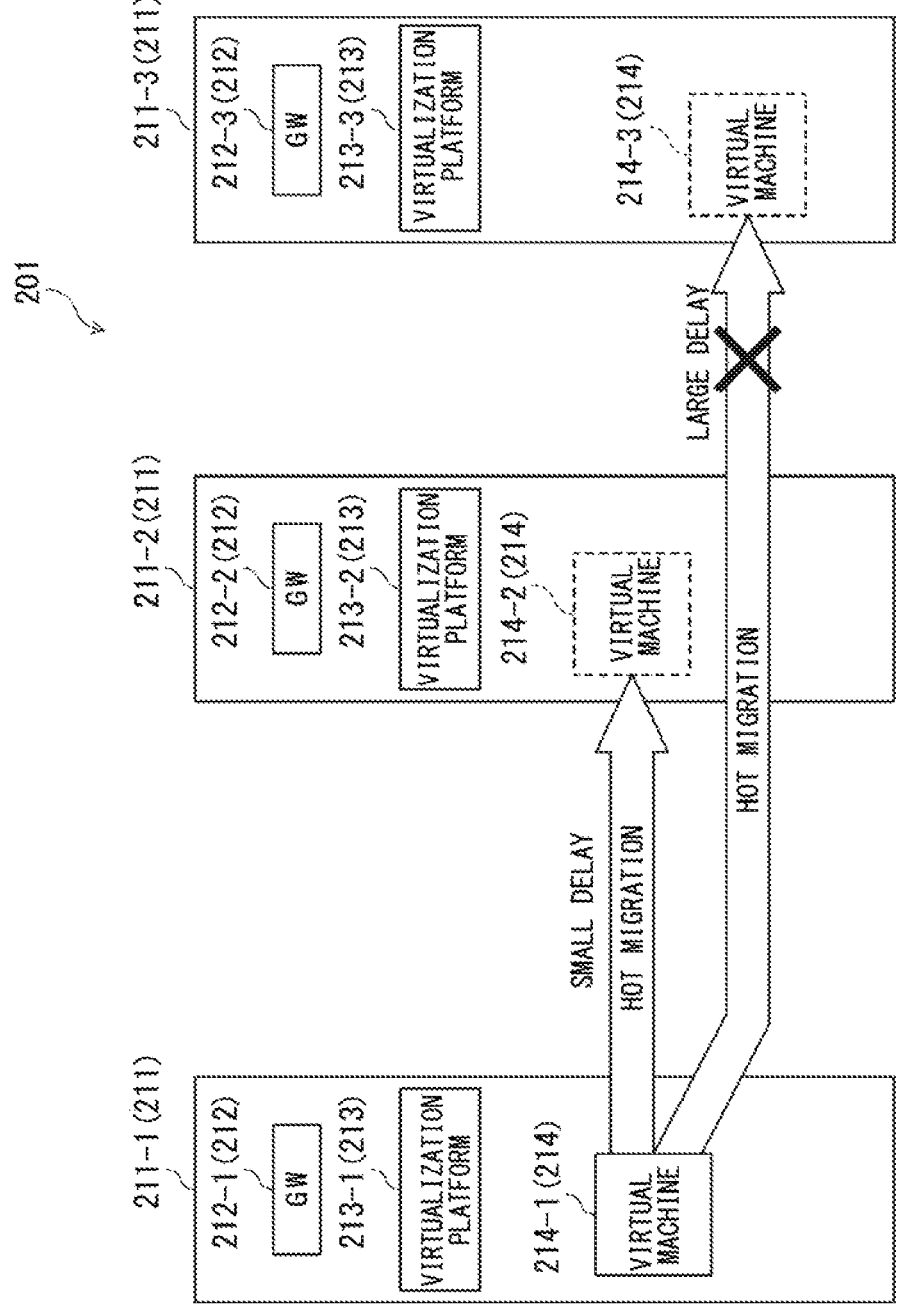

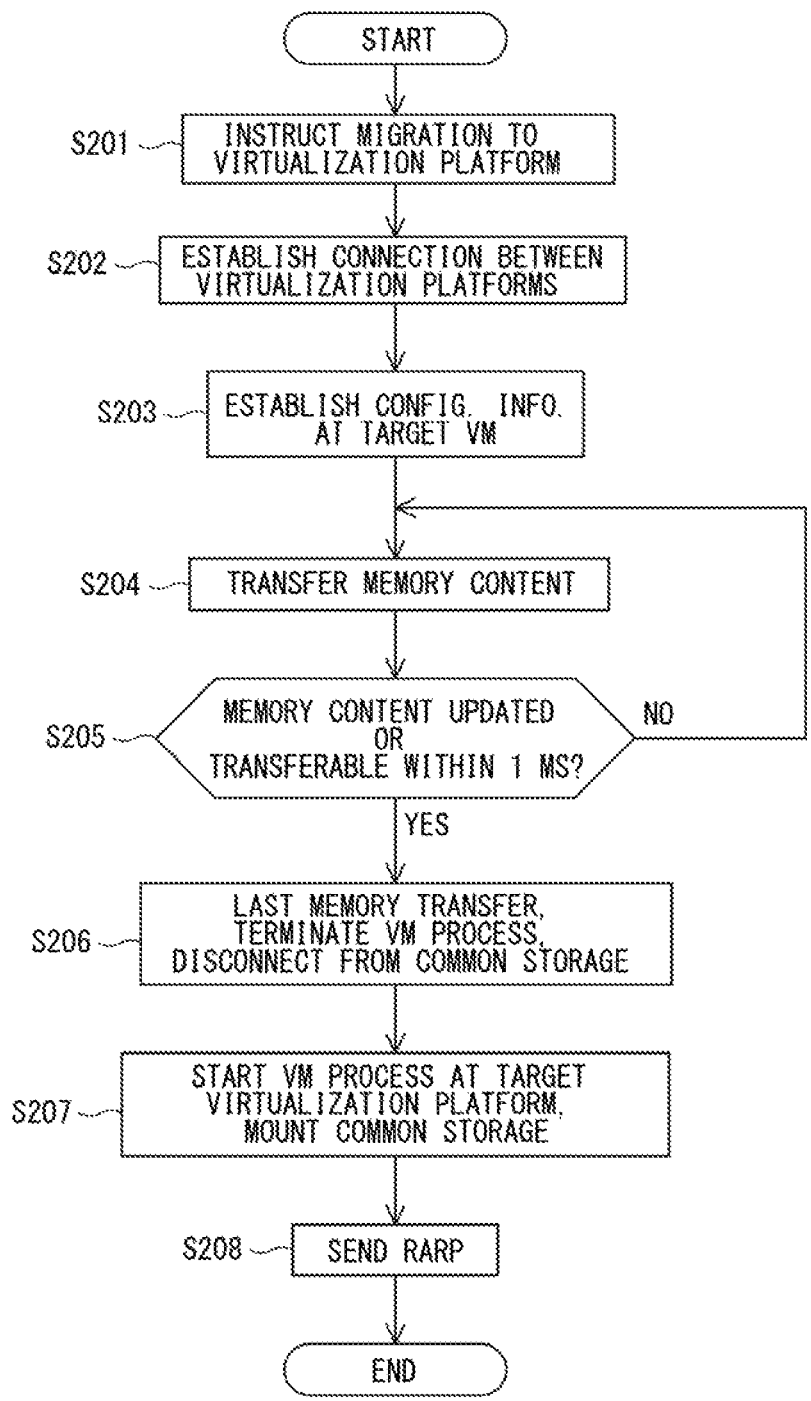

MIGRATION BETWEEN VIRTUAL MACHINES

CROSS-REFERENCE TO RELATED APPLICATIONS

This application is based upon and claims the benefit of priority of the prior Japanese Patent application No. 2013-113638, filed on May 30, 2013, the entire contents of which are incorporated herein by reference.

FIELD

The embodiments discussed herein are related to a virtual machine managing apparatus, a method of managing a virtual machine, and an information processing system.

BACKGROUND

Hot migration has been widely used in virtualization platforms (which are also known as hypervisors (HVs)), such as vSphere® available from VMware Inc. and Hyper-V® available from Microsoft Corporation.

Hot migration is a technique to transfer a virtual machine (VM) operating on a virtualization platform to another virtualization platform without interruption of the operation of the virtual machine.

For example, hot migration has been performed through the transfer of the content in a memory. In such a case, the data content of a virtual machine in a memory of a source virtualization platform is transferred to a memory of a target virtualization platform (this operation is hereinafter referred to as "memory transfer"). Upon completion of the memory transfer, the operation of the source virtual machine is switched to the operation of the target virtual machine. The memory transfer is performed through IP routing.

Nowadays, a virtual machine is hot-migrated within a single data center (DC) without stopping the operation of the virtual machine, for example, for maintenance of hardware.

The advent of cloud computing is expected to extend the distance between nodes in hot migration: for example, hot migration between Hokkaido and Kyushu and between Japan and a foreign country.

An increase in the frequency of connections among cloud environments will probably require hot migration of virtual machines over multiple cloud environments and DCs for the dispersion of the load among the DCs.

According to an aspect of the present invention, an object is to reduce the time from the occurrence of malfunction in an information processing device to the response of another information processing device.

Another object of the present invention is to achieve advantages through the configurations according to the embodiments of the present invention described below, the advantages not achievable through conventional art.

Based on such an assumption, vSphere provides a solution for long-distance hot migration referred to as Metro vMotion®.

VMware Metro vMotion can migrate a virtual machine without interruption in the operation of the virtual machine even if the round-trip delay between the virtualization platforms exceeds 5 ms.

FIG. 23 is a configuration diagram of a traditional information processing system 201.

The information processing system 201 includes data centers (DCs) 211-1, 211-2, and 211-3.

The DC 211-1 includes a gateway (GW) 212-1, a virtualization platform 213-1, and a virtual machine 214-1.

The DC 211-2 includes a GW 212-2 and a virtualization platform 213-2.

The DC 211-3 includes a GW 212-3 and a virtualization platform 213-3.

A specific DC among the multiple DCs will be indicated by one of the relevant reference signs 211-1, 211-2, and 211-3. If the DC does not need to be specified, the DC will be indicated by reference sign 211.

A specific GW among the multiple GWs will be indicated by one of the relevant reference signs 212-1, 212-2, and 212-3. If the GW does not need to be specified, the GW will be indicated by reference sign 212.

A specific virtualization platform among the multiple virtualization platforms will be indicated by one of the relevant reference signs 213-1, 213-2, and 213-3. If the virtualization platform does not need to be specified, the virtualization platform will be indicated by reference sign 213.

The DC 211, which is a data center supporting a virtualization environment, includes various computers and data communication devices (not shown).

The GW 212 connects the DC 211 to various networks. The GW 212, for example, is a general router that is representative of the DC 211.

The virtualization platform 213 includes a control program that is executed to create a virtual machine 214.

The virtualization platform 213, for example, may be Microsoft Hyper-V or VMware vSphere. Alternatively, any other virtualization platform may be used.

The virtual machine 214-1 is an emulated computer system configured in a computer. The virtual machine 214 includes an operating system (OS) and applications that operate on the virtualization platform 213. The virtual machine 214 is hot-migrated to another virtualization platform 213, as will be described below.

FIG. 24 is a flow chart illustrating a typical hot migration process performed in the information processing system 201.

In Step S201, a migration instruction is issued from an administrator to the virtualization platform 213-1.

Step S202 establishes the connection between the virtualization platforms 213-1 and 213-2.

Step S203 establishes the configuration information on the virtual machine 214-2 which is a target of migration.

Step S204 performs hot migration of the virtual machine. During the hot migration, the data content in the memory of the virtual machine 214-1 is transferred from the virtualization platform 213-1 to the virtualization platform 213-2.

Step S205 determines whether the memory content of the virtual machine 214-1 is updated and whether the memory content of the virtual machine 214-1 is transferrable from the virtualization platform 213-1 to the virtualization platform 213-2 within a predetermined threshold (for example, in 1 ms or less).

If the memory content of the virtual machine 214-1 is not updated and cannot be transferred within 1 ms (NO in Step S205), the process returns to Step S204.

If the memory content of the virtual machine 214-1 is updated or the memory content of the virtual machine 214-1 is transferrable within 1 ms (YES in Step S205), Step S206 performs last transfer on the memory from the virtualization platform 213-1 to the virtualization platform 213-2. The process (service) performed by the virtual machine 214-1 then stops, and the virtual machine 214-1 is disconnected from a common storage (not shown).

In Step S207, the migrated virtual machine 214-2 starts the process (service), and the common storage is mounted to the virtual machine 214-2.

In Step S208, the virtual machine 214-2 sends a reverse address resolution protocol (RARP) request for the update of the table in a switch (SW) (not shown).

With vMotion, the maximum round-trip delay of the transfer of a virtual machine between virtualization platforms is limited to a predetermined threshold (for example, 10 ms). Thus, the virtual machine cannot be hot-migrated over a long distance that causes a delay exceeding 10 ms.

In the example illustrated in FIG. 23, the DC 211-1 and the DC 211-2 have a low latency, that is, they are disposed close to each other. Thus, the virtual machine 214-1 of the DC 211-1 can be hot-migrated to DC 211-2 to establish the virtual machine 214-2.

The latency between the DC 211-1 and the DC 211-3 exceeds 10 ms due to a large distance therebetween. Thus, the virtual machine 214-1 of the DC 211-1 cannot be hot-migrated to the DC 211-3.

SUMMARY

A virtual-machine managing apparatus according to the present invention includes a delay storage unit that stores delay times between a plurality of managers managing a virtual machine; a route extractor that extracts a migration route from a source manager to a target manager based on the delay times between the managers stored in the delay storage unit such that the delay times between the managers are equal to or shorter than a threshold; and a migration controller that migrates the virtual machine from the source manager to the target manager through the migration route while maintaining the operation of the virtual machine.

A method of managing a virtual machine according to the present invention includes storing delay times between a plurality of managers that manage a virtual machine in a delay storage unit; extracting a migration route from a source manager to a target manager based on the delay times between the managers stored in the delay storage unit such that the delay time between the managers is equal to or shorter than a threshold; and migrating the virtual machine from the source manager to the target manager through the migration route while maintaining the operation of the virtual machine.

An information processing system includes a virtual-machine managing apparatus including a plurality of managers managing a virtual machine; a delay storage unit that stores delay times between the managers; a route extractor that extracts a migration route from a source manager to a target manager based on the delay times between the managers stored in the delay storage unit such that the delay times between the managers are equal to or shorter than a threshold; and a migration controller that migrates the virtual machine from the source manager to the target manager through the migration route while maintaining the operation of the virtual machine.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 illustrates an example site table of the information processing system according to an embodiment.

FIG. 6 illustrates an example virtualization platform table of the information processing system according to an embodiment.

FIG. 7 illustrates an example virtual machine table of the information processing system according to an embodiment.

FIG. 8 illustrates an example site table of the information processing system according to an embodiment.

FIG. 9 illustrates an example virtualization-platform availability table of the information processing system according to an embodiment.

FIG. 23 is a configuration diagram of a traditional information processing system.

FIG. 24 is a flow chart illustrating a traditional hot migration process performed in the information processing system.

DESCRIPTION OF EMBODIMENTS

Embodiments will now be described with reference to the accompanying drawings.

(A) Configuration

The configuration of an information processing system 1 according to an embodiment will now be described.

Figure 1:
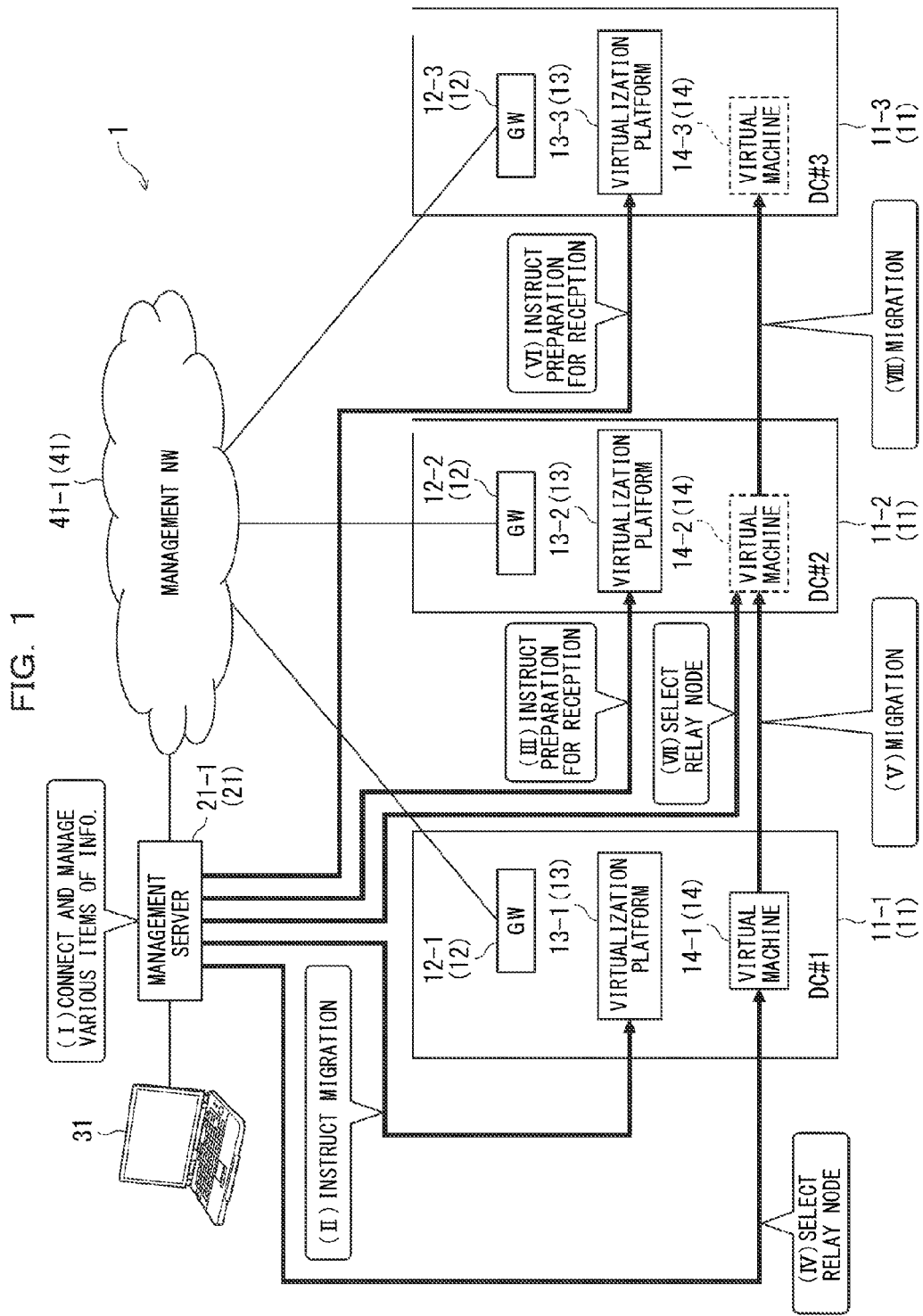
FIG. 1 is a schematic view of an information processing system according to an embodiment.

FIG. 1 is a schematic view of the information processing system 1 according to an embodiment.

The information processing system 1 includes DCs 11-1, 11-2, and 11-3, a management server (virtual machine managing apparatus) 21-1, a terminal 31, and a management network (NW) 41-1.

In the descriptions below and the accompanying drawings, the DC 11-1, DC 11-2, and DC 11-3 may also be referred to as DC #1, DC #2, and DC #3, respectively.

The DC 11-1 includes a GW 12-1, a virtualization platform (managing unit) 13-1, and a virtual machine 14-1.

The DC 11-2 includes a GW 12-2 and a virtualization platform 13-2.

The DC 11-3 includes a GW 12-3 and a virtualization platform 13-3.

A specific DC of the multiple DCs will be indicated by one of reference signs 11-1, 11-2, and 11-3. If the DC does not need to be specified, the relevant DC will be indicated by reference sign 11.

A specific GW of the multiple GWs will be indicated by one of reference signs 12-1, 12-2, and 12-3. If the GW does not need to be specified, the relevant GW will be indicated by reference sign 12.

A specific virtualization platform of the multiple virtualization platforms will be indicated by one of reference signs 13-1, 13-2, and 13-3. If the virtualization platform does not need to be specified, the relevant virtualization platform will be indicated by reference sign 13.

The DC 11 supports a virtual environment and includes various computers and data communication devices (not shown).

The GW 12 connects the DC 11 to the management network 41-1. The GW 12, for example, is a general router that is representative of the DC 11.

The virtualization platform 13 comprises a control program that is executed to create a virtual machine 14.

The virtualization platform 13 may be, for example, Microsoft Hyper-V or VMware vSphere. Alternatively, any other virtualization platform may be used.

The virtual machine 14 is an emulated computer system configured in a computer. The virtual machine 14 comprises an OS and applications that operate on the virtualization platform 13. The virtual machine 14 is transferred to another virtualization platform 13 through the hot migration instructed by the management server 21-1, as will be described below.

The terminal 31, which is, for example, a typical personal computer (PC), is an information processing device used by the administrator or operator of the information processing system 1 for administration.

The management server 21-1, which is, for example, a computer that functions as a server, is an information processing device that manages the GWs 12, the virtualization platforms 13, and the virtual machines 14 (hereinafter, the GWs 12, the virtualization platforms 13, and the virtual machines 14 may also be collectively referred to as "nodes"). The management server 21-1 receives instructions from the administrator (or operator) via the terminal 31.

The management network 41-1, which is provided separately from the network for ordinary work, connects the DCs 11-1, 11-2, and 11-3 and the management server 21-1.

In the example illustrated in FIG. 1, the latency between the DC 11-1 and the DC 11-2 is low (below the threshold of a solution represented by vSphere). Thus, the virtual machine 14-1 in the DC 11-1 can be directly hot-migrated to DC 11-2 to establish the virtual machine 14-2. In contrast, the virtual machine 14-1 in the DC 11-1 cannot be directly hot-migrated to the DC 11-3 because the latency between the DC 11-1 and the DC 11-3 exceeds the threshold due to the large distance between the DCs. Hereinafter, the terms "long distance" and "short distance" are synonymous with "high latency" and "low latency," respectively.

According to this embodiment, the virtual machine 14-1 in the DC 11-1 is hot-migrated to the DC 11-2 to temporarily establish the virtual machine 14-2. Then, the virtual machine 14-2 is hot-migrated to the DC 11-3. That is, instead of directly migrating the virtual machine 14 to a target virtualization platform 13, the virtual machine 14 is migrated in several steps through multiple virtualization platforms 13 until it reaches the target virtualization platform 13. The virtualization platforms 13 through which the virtual machine 14 is migrated are referred to as "relay nodes."

The information on the DCs 11, the virtualization platforms 13, and the virtual machines 14 required for the hot migration is stored in advance in the management server 21 and is referred to before and during the hot migration by a relay-node identifier 23 of the management server 21 (for details, refer to the description below with reference to FIG. 2) to determine an optimal destination of the hot migration.

Specifically, as illustrated in FIG. 1, in Step (I), the management server 21-1 collects information from the nodes (the GWs 12, the virtualization platforms 13, and the virtual machines 14) and stores this information in management tables 51 to 55.

In Step (II), the management server 21-1 instructs the virtualization platform 13-1 to hot-migrate the virtual machine 14-1 in the DC 11-1 to the DC 11-3.

In Step (III), the management server 21-1 instructs the virtualization platform 13-2 to prepare for the reception of the virtual machine 14 from the DC 11-1. The preparation for the reception of the virtual machine 14, for example, includes securing resources, such as a central processing unit (CPU) and memory.

In Step (IV), the management server 21-1 selects the DC 11-2 as a relay node for the hot migration of the virtual machine 14-1 in the DC 11-1.

In Step (V), the virtual machine 14-1 in the DC 11-1 is hot-migrated to the DC 11-2 to establish the virtual machine 14-2.

In Step (VI), the management server 21-1 instructs the virtualization platform 13-3 to prepare for the reception of the virtual machine 14 from the DC 11-2.

In Step (VII), the management server 21-1 selects the DC 11-3 as a relay node for the hot migration (which in this case is the final destination) of the virtual machine 14-2 in the DC 11-2.

In Step (VIII), the virtual machine 14-2 in the DC 11-2 is hot-migrated to the DC 11-3 to establish the virtual machine 14-3.

The information processing system 1 according to this embodiment migrates the virtual machine 14 in steps from the DC 11-1 to the DC 11-3 via the DC 11-2 (long-distance hot migration). Details of this will now be described.

Figure 2:
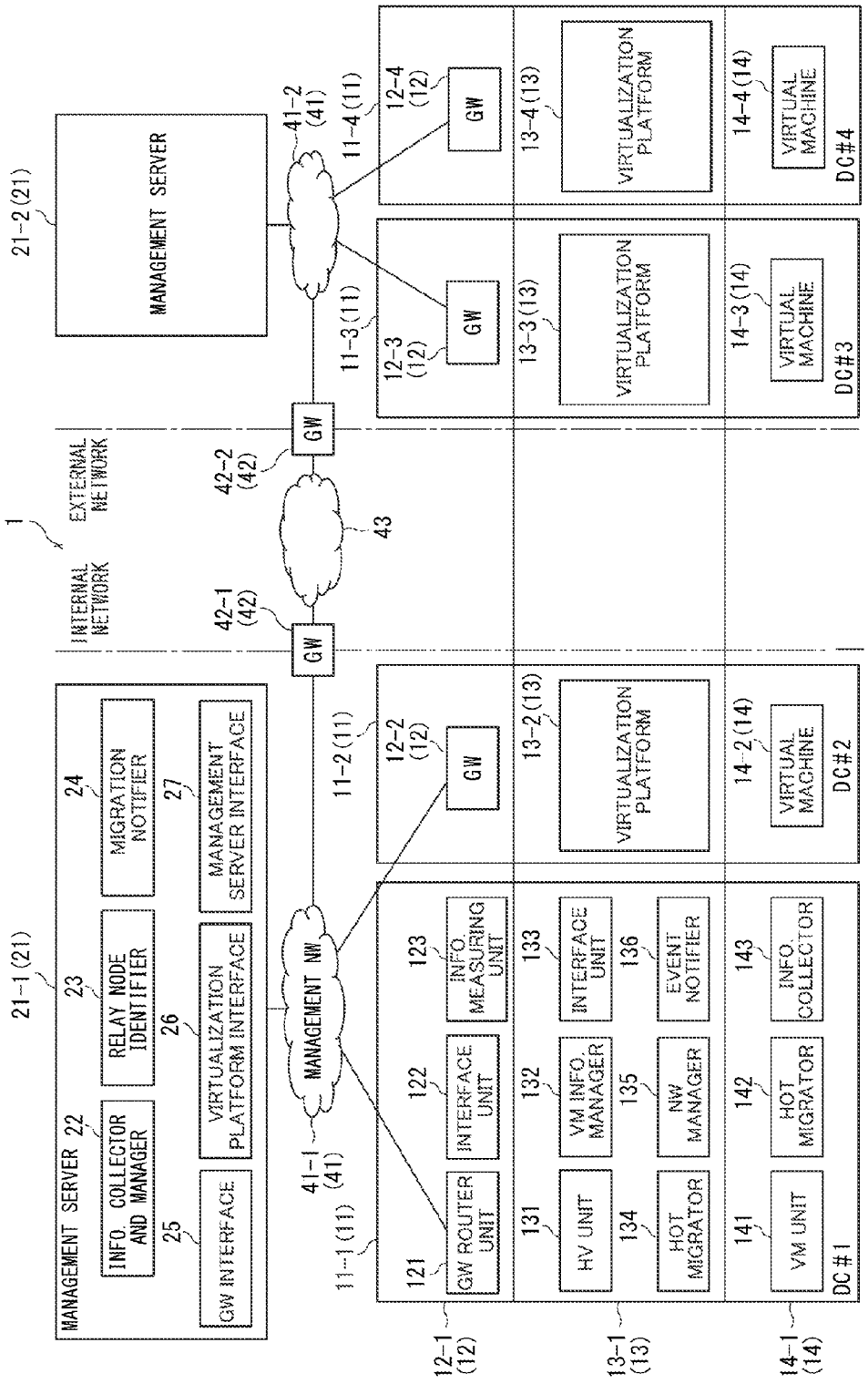
FIG. 2 illustrates the functional configuration of the information processing system according to an embodiment.

FIG. 2 illustrates the functional configuration of the information processing system 1 according to this embodiment.

The management server 21-1 includes an information collector and manager (delay storage unit) 22, a relay-node identifier (route extractor) 23, a migration notifier (migration controller) 24, a GW interface 25, a virtualization platform interface 26, and a management server interface (cooperation unit) 27.

The information collector and manager 22 collects information on the nodes and the delay (latency) between the nodes and stores this information in the management tables 51 to 55, which will be described below with reference to FIGS. 5 to 9.

Figure 16A:
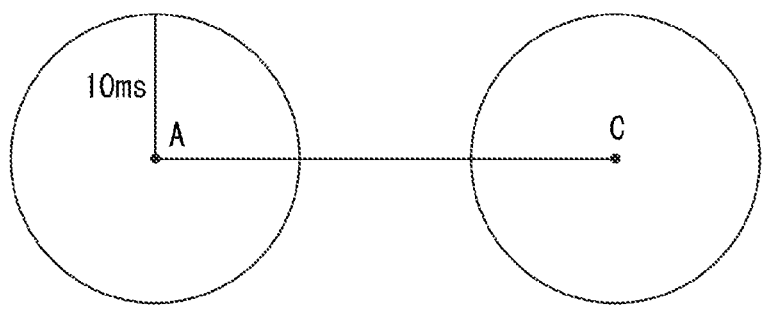
FIGS. 16A to 16C are flow charts illustrating the relay node determination process performed at the information processing system according to an embodiment.
Figure 16B:
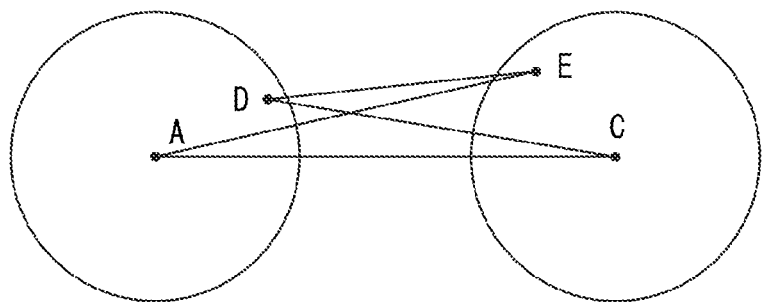
Figure 16C:
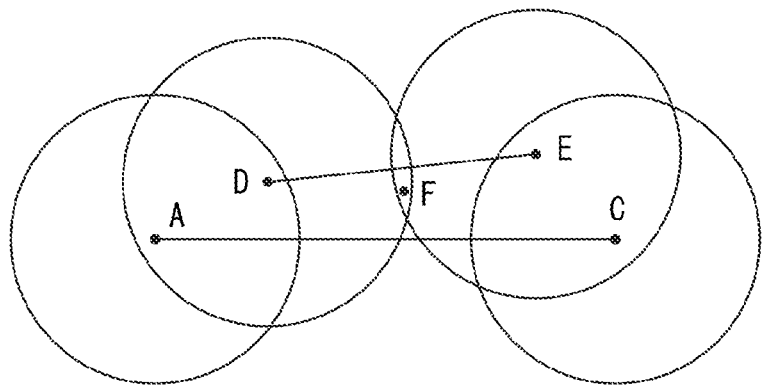

The relay-node identifier 23 determines the relay nodes (through a relay-node identifying algorithm), as illustrated in FIGS. 16A to 16C, and selects the relay nodes before the long-distance hot migration.

The migration notifier 24 instructs the virtualization platform 13 to perform hot migration.

The GW interface 25 transmits information between the management server 21-1 and the GW 12.

The virtualization platform interface 26 transmits information between the management server 21-1 and the virtualization platform 13.

The management server interface 27 connects the management server 21-1 with other management servers (such as the management server 21-2). The management server interface 27 enables migration between clouds, such as hot migration between the Amazon cloud provided by Amazon.com Inc. and the Google cloud provided by Google Inc.

FIG. 2 illustrates only the configuration of the management server 21-1. The functional configuration of the management server 21-2 is also the same as that of the management server 21-1. Thus, the description and illustration will be omitted on the functional configuration of the management server 21-2.

A specific management server of the multiple management servers will be indicated by one of reference signs 21-1 and 21-2. If the management server does not need to be specified, the relevant management server will be indicated by reference sign 21.

The GW 12-1 includes a GW router unit 121, an interface unit 122, and an information measuring unit 123.

The GW router unit 121 functions as a typical GW router.

The interface unit 122 transmits information between the GW 12-1 and the management server 21-1.

The information measuring unit 123 receives an instruction from the management server 21-1 to measure the latency between the management server 21-1 and other nodes. For example, the information measuring unit 123 issues commands to another node and measure the latency through the measurement of the time from the transmission of the command to the response from the node.

FIG. 2 illustrates only the configuration of the GW 12-1. The functional configurations of the GWs 12-2, 12-3, and 12-4 are also the same as that of the GW 12-1. Thus, the descriptions and illustrations will be omitted on the functional configurations of the GWs 12-2, 12-3, and 12-4.

The virtualization platform 13-1 includes a hypervisor (HV) unit 131, a virtual machine (VM) information manager 132, an interface unit 133, a hot migrator 134, a network (NW) manager 135, and an event notifier 136.

The HV unit 131 functions as a typical virtualization platform for the execution, resource assignment, and management of the virtual machine 14-1.

The VM information manager 132 manages various items of information associated with the virtual machine 14-1 under the control of the virtualization platform 13-1.

The interface unit 133 transmits information between the virtualization platform 13-1 and the management server 21-1.

The hot migrator 134 performs hot migration of the virtual machine 14 to another virtualization platform 13.

The NW manager 135 manages the network connection to the virtualization platform 13-1.

The event notifier 136 sends the management server 21-1 information associated with an event upon the occurrence of the event, such as hot migration.

FIG. 2 illustrates only the configuration of the virtualization platform 13-1. The functional configuration of the virtualization platforms 13-2, 13-3, and 13-4 are also the same as that of the virtualization platform 13-1. Thus, the descriptions and illustrations will be omitted on the functional configurations of the virtualization platforms 13-2, 13-3, and 13-4.

The virtual machine 14-1 includes a virtual machine (VM) unit 141, a hot migrator 142, and an information collector 143.

The VM unit 141 functions as a typical virtual machine 14-1.

The hot migrator 142 hot-migrates the virtual machine 14-1 to another virtualization platform 13.

The information collector 143 collects various items of information associated with the virtual machine 14-1.

FIG. 2 illustrates only the configuration of the virtual machine 14-1. The functional configurations of the virtual machines 14-2, 14-3, and 14-4 are also the same as that of the virtual machine 14-1. Thus, the descriptions and illustrations will be omitted on the functional configurations of the virtual machines 14-2, 14-3, and 14-4.

As illustrated in FIG. 2, the DCs 11-1 and 11-2 in an internal network are connected to the DCs 11-3 and 11-4 in an external network via GWs 42-1 and 42-2 and a network 43. This configuration is merely an example, and alternative configurations may be employed. For example, the DCs 11-1 to 11-4 may be mutually connected within a single network, or the DC 11-1 in an internal network may be connected the DCs 11-2 to 11-4 in an external network.

Figure 3:
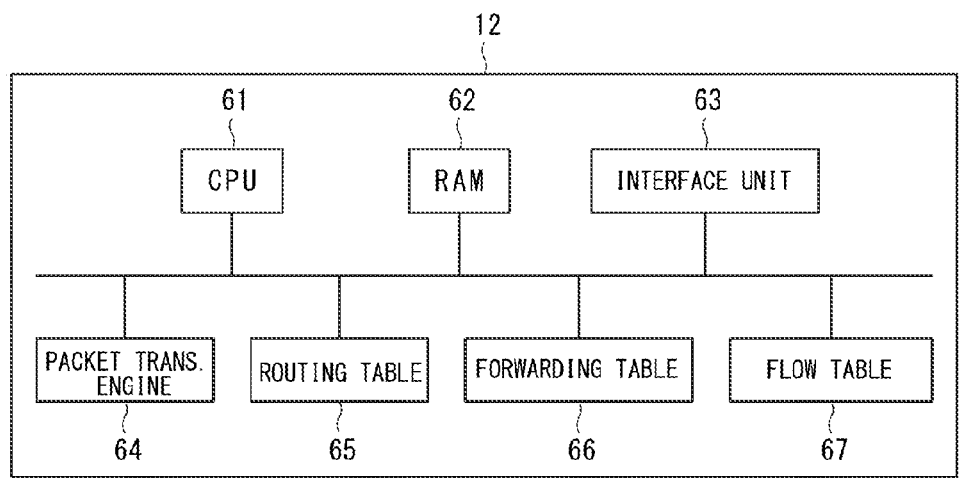
FIG. 3 illustrates the hardware configuration of a gateway according to an embodiment.

FIG. 3 illustrates the hardware configuration of the GW 12 according to an embodiment.

The GW 12 includes a CPU 61, a random access memory (RAM) 62, an interface unit 63, a packet transfer engine 64, a routing table 65, a forwarding table 66, and a flow table 67.

The CPU 61 executes the programs stored in the RAM 62 and other memories, which will be described below, to perform various processes. The CPU 61 may be any known CPU.

The RAM 62 stores programs to be executed by the CPU 61, various items of data, or data acquired through the operation of the CPU 61.

The interface 63 connects the GW 12 to a network.

The packet transfer engine 64 transfers the packets received by the GW 12 to other devices.

The routing table 65 stores the destination of the packets.

The forwarding table 66 stores the subsequent destination of the packets.

The flow table 67 stores information associated with the flow of the packets.

The program executed to establish the function of the information measuring unit 123 in the GW 12 is provided in the form of a program recorded on a computer-readable recording medium, such as a flexible disc, a CD (CD-ROM, CD-R, CD-RW, or another type of CD), a DVD (DVD-ROM, DVD-RAM, DVD-R, DVD+R, DVD-RW, DVD+RW, HD DVD, or another type of DVD), a Blu-ray Disc, a magnetic disc, an optical disc, or a magnetooptical disc. The computer reads the program on the recording medium with a reader (not shown) and sends the program to an internal or external storage device for storage. Alternatively, the program may be stored in a storage device (recording medium), such as a magnetic disc, an optical disc, or a magnetooptical disc, and then sent from the storage device to the computer via a communication path.

A microprocessor (the CPU 61 in this embodiment) executes a program stored in an internal storage device (the RAM 62 in this embodiment) to achieve the functions of the information measuring unit 123. Alternatively, a computer may read and execute the program stored in a recording medium.

Figure 4:
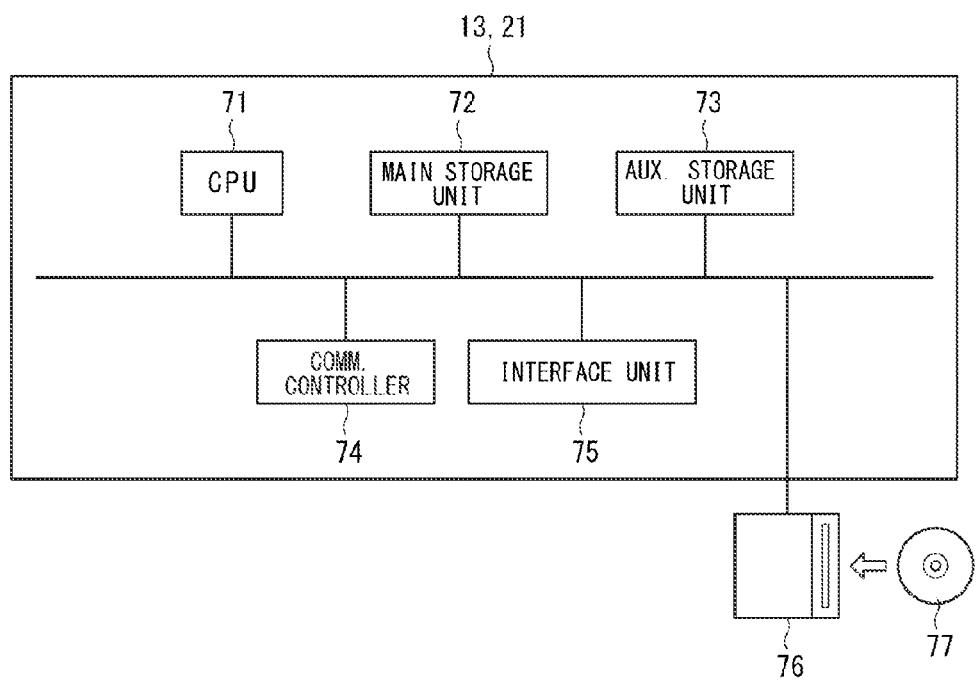
FIG. 4 illustrates the hardware configuration of a management server according to an embodiment that supports a virtualization platform.

FIG. 4 illustrates the hardware configuration of the management server 21 according to an embodiment that supports the virtualization platform 13.

The management server 21 supporting the virtualization platform 13 includes a CPU 71, a main storage unit 72, an auxiliary storage unit 73, a communication controller 74, an interface unit 75, and a medium reader 76.

The CPU 71 runs an OS and other associated programs (not shown), which constitute system software providing the basic functions of the virtualization platform 13 and the management server 21. The programs stored in the main storage unit 72 and other units, which will be described below, are executed to perform various procedures. The CPU 71 may be a known CPU.

The main storage unit 72 stores the programs to be executed by the CPU 71, various items of data, and data acquired through the operation of the CPU 71. The main storage unit 72 may be, for example, a hard disk drive (HDD).

The auxiliary storage unit 73 is a storage area that temporarily stores data while the CPU 71 executes a program. The auxiliary storage unit 73 may be, for example, a RAM.

The communication controller 74 controls the interface unit 75 and to control the communication with an external network.

The interface unit 75, which is, for example, a local area network (LAN) card, is an adapter connecting the virtualization platform 13 and the management server 21 to an external network.

The medium reader 76 is, for example, a CD-ROM drive or a DVD-ROM drive that reads a recording medium 77, such as a CD-ROM or a DVD-ROM.

The programs executed to provide the functions of the information collector and manager 22, the relay-node identifier 23, the management server interface 27, and the event notifier 136 are provided in the form of programs recorded on the computer-readable recording medium 77, such as a flexible disc, a CD (CD-ROM, CD-R, CD-RW, or another type of CD), a DVD (DVD-ROM, DVD-RAM, DVD-R, DVD+R, DVD-RW, DVD+RW, HD DVD, or another type of DVD), a Blu-ray Disc, a magnetic disc, an optical disc, or a magnetooptical disc. The computer reads the program on the recording medium 77 with the medium reader 76 and sends the program to an internal or external storage device for storage. Alternatively, the program may be stored in a storage device (the recording medium 77), such as a magnetic disc, an optical disc, or a magnetooptical disc, and then sent from the storage device to the computer via a communication path.

A program stored in an internal storage device (the main storage unit 72 in this embodiment) is executed by the microprocessor of the computer (the CPU 71 in this embodiment) to provide the functions of the information collector and manager 22, the relay-node identifier 23, the management server interface 27, and the event notifier 136. The computer may read and execute the programs stored in the recording medium 77.

In this embodiment, the computer includes hardware and an OS, where the hardware operates under the control of the OS. Hardware may be considered to be a computer if the hardware is operated by a single application program not requiring an OS. The hardware includes, at least, a microprocessor, such as a CPU, and means for reading a computer program stored in the recording medium 77. In this embodiment, the virtualization platform 13 and the management server 21 function as a computer.

The management tables 51 to 55 of the information processing system 1 according to an embodiment will now be described with reference to FIGS. 5 to 9.

FIG. 5 illustrates an example site table 51 of the information processing system 1 according to an embodiment.

The site table 51 stores information on the sites (DCs 11) and the IPs of the GWs 12 of the DCs 11.

As illustrated in FIG. 5, the site table 51 contains the following fields: site ID 511, site name 512, and GW IP 513.

The site ID 511 stores a unique identifier (ID) for each site (DC 11).

The site ID 511 stores the name of each site.

The GW IP 513 stores the IP address of the representative GW 12 of each site.

The information stored in the site table 51 is collected by the GW 12 in response to a request from the management server 21.

FIG. 6 illustrates an example virtualization platform table 52 of the information processing system 1 according to an embodiment.

The virtualization platform table 52 stores information on the virtualization platform 13.

The virtualization platform table 52 contains the following fields: HV ID 521, HV name 522, HV IP 523, site ID 524, latency 525, and latest update 526.

The HV ID 521 stores a unique identifier for each virtualization platform 13.

The HV name 522 stores the name of each virtualization platform 13.

The HV IP 523 stores the IP address of each virtualization platform 13.

The site ID 524 stores the ID of the site (DC 11) supporting each virtualization platform 13.

The latency 525 stores the latency (delay) between each GW 12 and each virtualization platform 13. As described above, latency is determined, for example, through the measurement of the round-trip response of a command.

The latest update 526 stores the date of the latest update of the information in the fields 521 to 525.

The information stored in the virtualization platform table 52 is collected by the information measuring unit 123 of the GW 12 in response to a request from the management server 21.

FIG. 7 illustrates an example virtual machine table 53 of the information processing system 1 according to an embodiment.

The virtual machine table 53 stores information on the virtual machines 14 and resource information on the virtual machines 14.

The virtual machine table 53 contains the following fields for the usage of resources: VM ID 531, VM name 532, CPU usage 533, memory usage 534, HDD usage 535, NIC 536, NW name 537, and HV ID 538.

The VM ID 531 stores a unique identifier for each virtual machine 14.

The VM name 532 stores the name of each virtual machine 14.

The CPU usage 533 stores the CPU usage (%) assigned to each virtual machine 14.

The memory usage 534 stores the memory usage (for example, in gigabytes (GB)) assigned to each virtual machine 14.

The HDD usage 535 stores the HDD usage (for example, in GB) assigned to each virtual machine 14.

The NIC 536 stores an identifier for the network interface card (NIC) assigned to each virtual machine 14.

The NW name 537 stores the network name of the network (NW) connected to each virtual machine 14.

The HV ID 538 stores the ID of the virtualization platform 13 supporting each virtual machine 14.

The information stored in the virtual machine table 53 is collected by the GW 12 in response to a request from the management server 21.

FIG. 8 illustrates an example site table 54 of the information processing system 1 according to an embodiment.

The site table 54, which stores the latency (delay) between the DCs 11, is prepared for each DC 11.

The site table 54 contains the following fields for each site (DC 11): DST site ID 541, latency 542, and latest update 543.

The DST site ID 541 stores the ID of the connected site (DC 11).

The latency 542 stores the latencies (delay times) between sites. As described above, the latency is determined, for example, through the measurement of the round-trip response of a command.

The latest update 543 stores the date of the collection of the information on the latency 542.

The information stored in the site table 54 is collected by the information measuring unit 123 of the GW 12 in response to a request from the management server 21.

FIG. 9 illustrates an example virtualization-platform availability table 55 of the information processing system 1 according to an embodiment.

The virtualization-platform availability table 55 stores hardware information of each virtualization platform 13.

The virtualization-platform availability table 55 contains the following fields: HV ID 551, CPU usage 552, memory usage 553, HDD usage 554, NIC 555, and latest update 556.

The HV ID 551 stores a unique identifier for each virtualization platform 13.

The CPU usage 552 stores the CPU usage (%) assigned to each virtual machine 14.

The memory usage 553 stores the memory usage (for example, GB) assigned to each virtual machine 14.

The HDD usage 554 stores the HDD usage (for example, in TG) assigned to each virtual machine 14.

The NIC 555 stores an identifier for the NIC assigned to each virtual machine 14.

The latest update 556 stores the date of the latest update of the information in the fields 551 to 555.

The information stored in the virtualization-platform availability table 55 is collected by the GW 12 in response to a request from the management server 21.

(B) Operation

The operation of the information processing system 1 according to an embodiment will now be described.

The hot migration process performed in the information processing system 1, which is illustrated in FIGS. 1 and 2, will now be described with reference to FIGS. 10 to 12.

Figure 10:
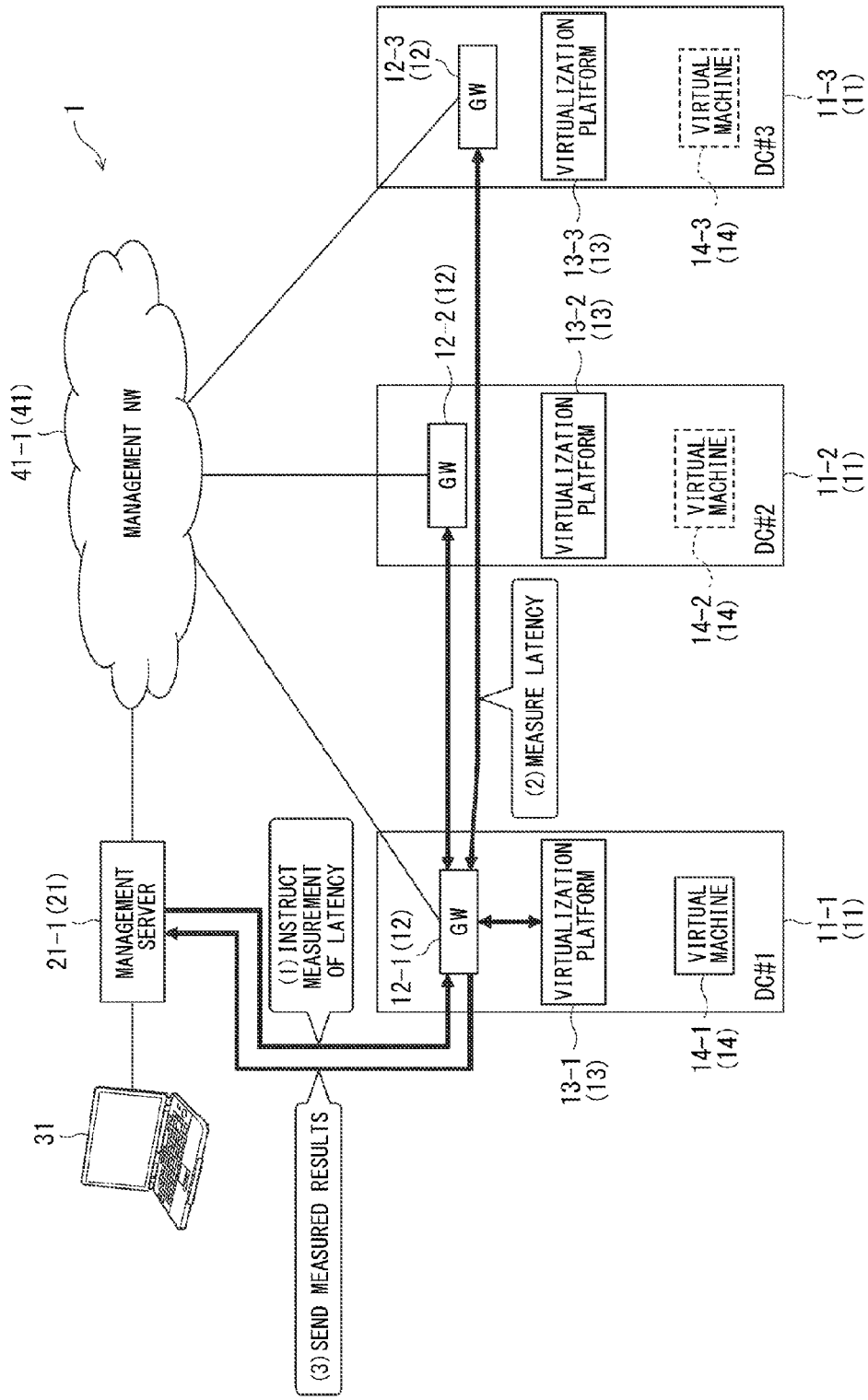
FIG. 10 illustrates the overall operation of the information processing system according to an embodiment.
Figure 11:
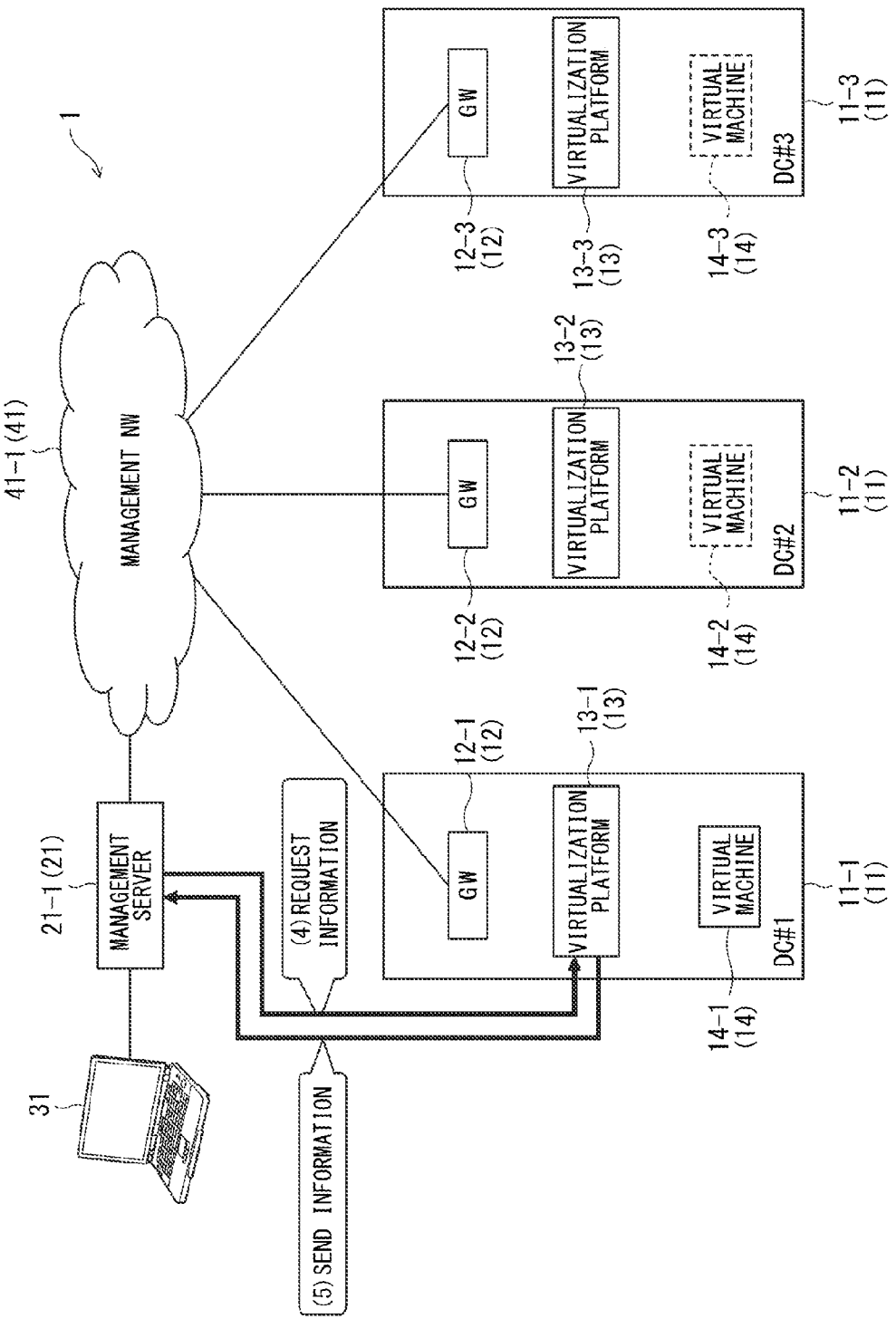
FIG. 11 illustrates the overall operation of the information processing system according to an embodiment.
Figure 12:
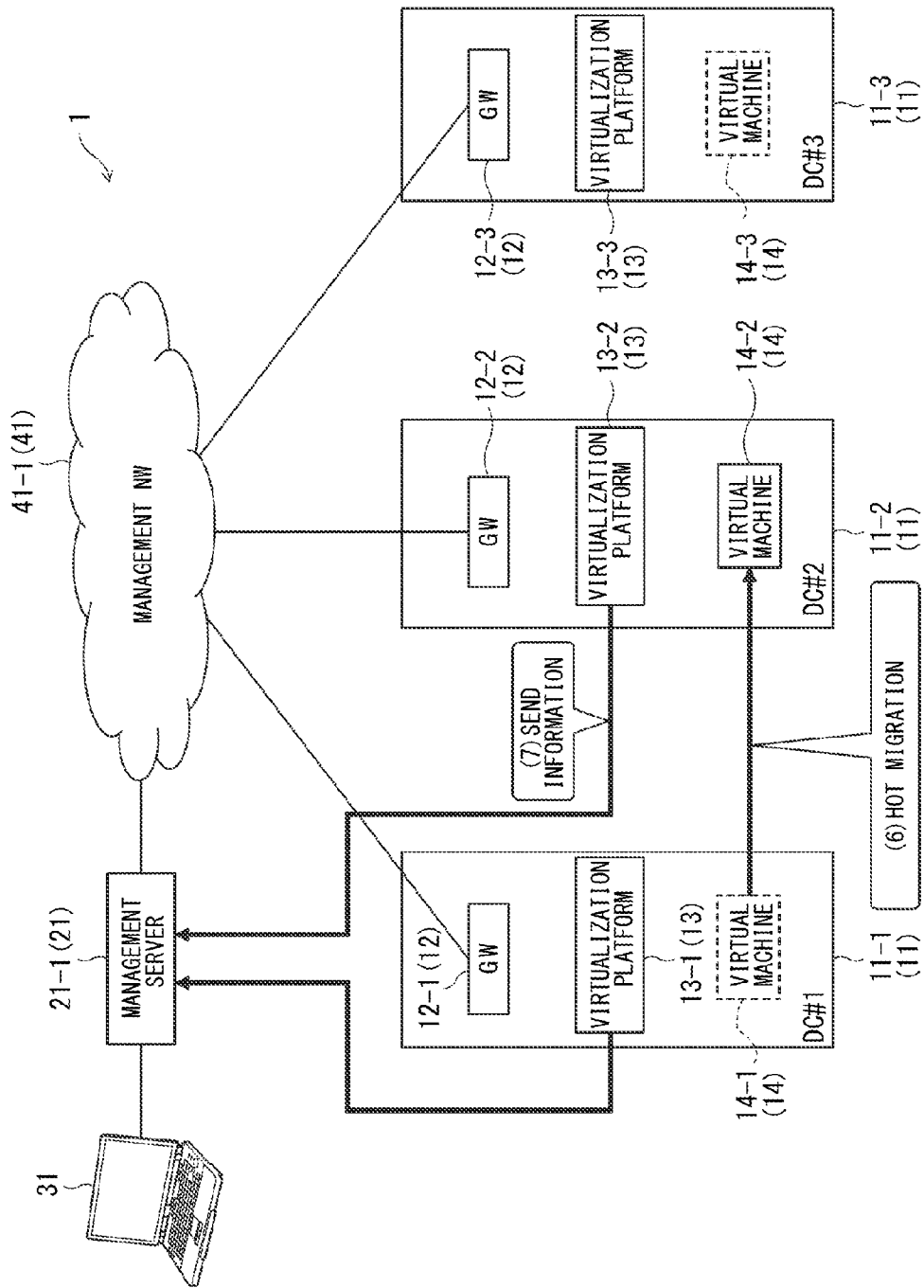
FIG. 12 illustrates the overall operation of the information processing system according to an embodiment.

FIGS. 10 to 12 illustrate the overall operation of the information processing system 1 according to an embodiment.

In Step (1) illustrated in FIG. 10, the information collector and manager 22 of the management server 21 instructs each node (GW 12, virtualization platform 13) to measure the latency. For example, the information collector and manager 22 requests each node for the information on the latency between the DCs 11 and the latency between the virtual machine 14 and the GW 12 in each DC 11.

In Step (2) illustrated in FIG. 10, the information measuring unit 123 of the GW 12 measures the latencies between the DCs 11 and the latency between the virtual machine 14 and the GW 12 in each DC 11.

In Step (3) illustrated in FIG. 10, the interface unit 122 of the GW 12 sends the latencies measured in Step (2) to the management server 21. The information collector and manager 22 of the management server 21 stores the latencies sent from the GW 12 in the virtual machine table 53 (refer to FIG. 7) and the site table 54 (refer to FIG. 8).

In Step (4) illustrated in FIG. 11, the information collector and manager 22 of the management server 21 instructs each node (the virtualization platform 13 and the virtual machine 14) to collect various items of information. For example, the information collector and manager 22 requests for the information on the virtualization platform 13 in the DC 11 and the information of the virtual machine 14 in the DC 11.

In Step (5) illustrated in FIG. 11, the interface unit 133 of the virtualization platform 13 sends the information on the virtualization platform 13 of the DC 11 and the information on the virtual machine 14 in the DC 11 to the management server 21. The information collector and manager 22 of the management server 21 stores the information from the virtualization platform 13 in the site table 51 (refer to FIG. 5), the virtualization platform table 52 (refer to FIG. 6), the virtual machine table 53 (refer to FIG. 7), and the site table 54 (refer to FIG. 8).

In Step (6) illustrated in FIG. 12, the virtual machine 14-1 in the DC 11-1 is hot-migrated to the DC 11-2 to establish the virtual machine 14-2.

In Step (7) illustrated in FIG. 12, the event notifier 136 of the virtualization platform 13 sends the result of the hot migration to the management server 21. The interface unit 133 of the virtualization platform 13 sends the post-hot-migration information on the nodes to the management server 21.

The information collector and manager 22 of the management server 21 stores the information from the virtualization platform 13 in the site table 51 (refer to FIG. 5), the virtualization platform table 52 (refer to FIG. 6), the virtual machine table 53 (refer to FIG. 7), and the site table 54 (refer to FIG. 8).

The latency measurement process performed in the information processing system 1 will now be described with reference to FIG. 13.

Figure 13:
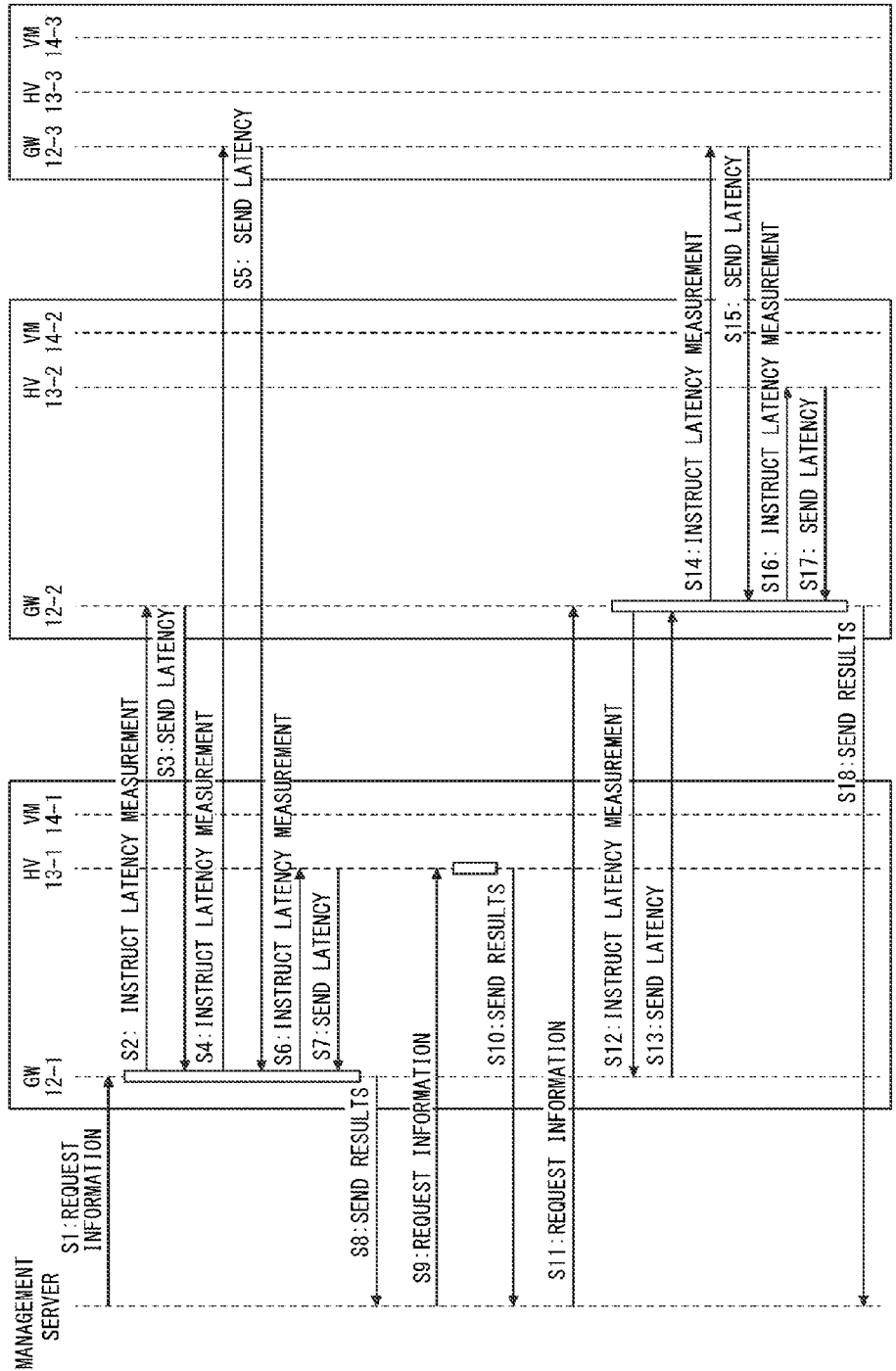
FIG. 13 illustrates a latency measurement process performed in the information processing system according to an embodiment.

FIG. 13 illustrates a latency measurement process performed in the information processing system 1 according to an embodiment.

In Step S1, the information collector and manager 22 of the management server 21 sends a request for information to the GW 12-1.

In Step S2, the GW 12-1 instructs the GW 12-2 to measure the latency.

In Step S3, the information measuring unit 123 of the GW 12-2 measures the latency and sends the measured latency to the GW 12-1. The latency can be determined, for example, through the measurement of the time from the issuing of aping command to the reception of the ping command.

In Step S4, the GW 12-1 instructs the GW 12-3 to measure the latency.

In Step S5, the information measuring unit 123 of the GW 12-3 measures the latency and sends the measured latency to the GW 12-1.

In Step S6, the GW 12-1 measures the latency between the GW 12-1 and the virtualization platform 13-1.

In Step S7, the virtualization platform 13-1 sends the information used for the measurement of the latency to the GW 12-1.

Steps S2, S4, an S6 may be performed simultaneously.

In Step S8, the GW 12-1 sends the measured latency to the management server 21.

In Step S9, the management server 21 sends a request for information to the virtualization platform 13-1.

In Step S10, the virtualization platform 13-1 sends information on the virtualization platform 13-1 to the management server 21.

In Step S11, the management server 21 sends a request for information to the GW 12-2.

In Step S12, the GW 12-2 instructs the GW 12-1 to measure the latency.

In Step S13, the information measuring unit 123 of the GW 12-1 measures the latency and sends the measured latency to the GW 12-2.

In Step S14, the GW 12-2 instructs the GW 12-3 to measure the latency.

In Step S15, the information measuring unit 123 of the GW 12-3 measures the latency and sends the measured latency to the GW 12-2.

In Step S16, the GW 12-2 measures the latency between the GW 12-2 and the virtualization platform 13-2.

In Step S17, the virtualization platform 13-2 sends the information used for the measurement of the latency to the GW 12-1.

Steps S12, S14, and S16 may be performed simultaneously.

In Step S18, the GW 12-2 sends the measured latency to the management server 21.

These procedures are performed in the DCs 11 under the control of the management server 21 to collect information on the latency of the DCs 11 under the control of the management server 21.

Figure 14:
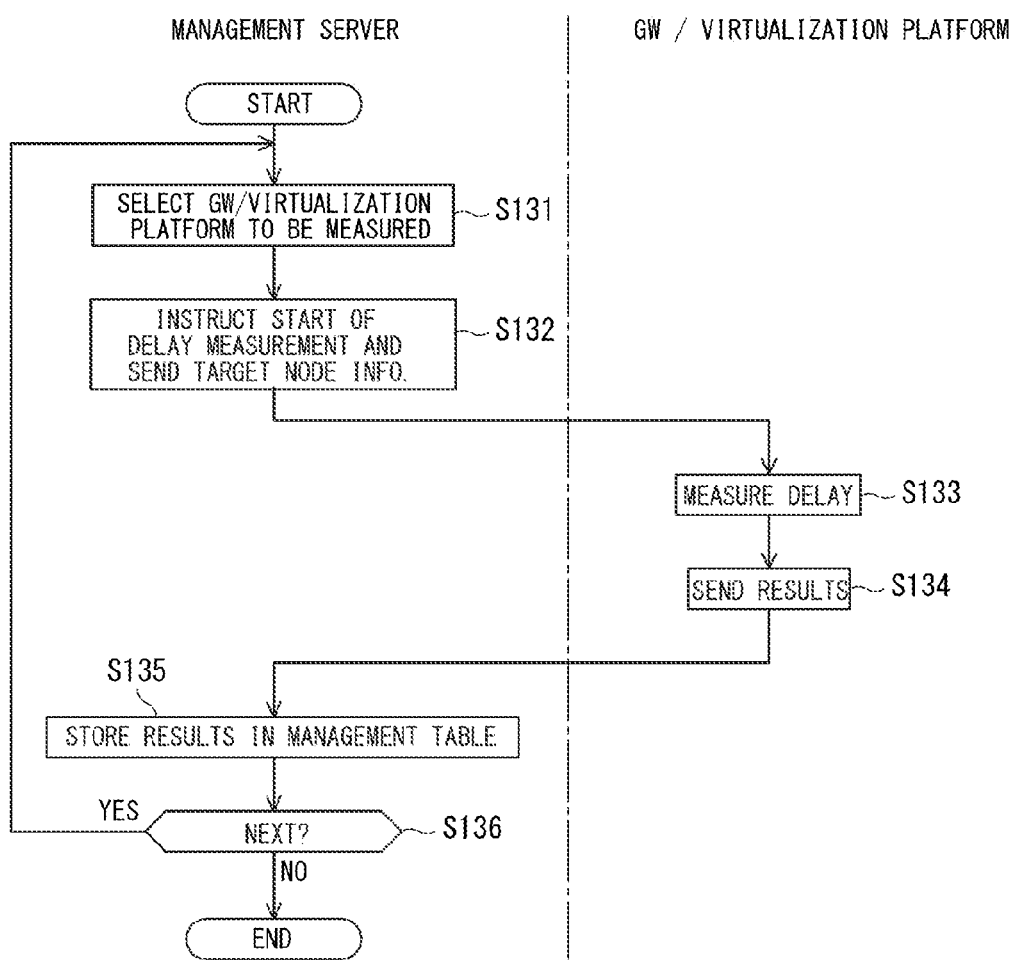
FIG. 14 is a flow chart illustrating a latency measurement process performed in the information processing system according to an embodiment.

FIG. 14 is a flow chart illustrating the latency measurement process performed in the information processing system 1 according to an embodiment.

In Step S131, the information collector and manager 22 of the management server 21 selects the GW 12 or virtualization platform 13 to be measured.

In Step S132, the information collector and manager 22 of the management server 21 instructs the GW 12 or virtualization platform 13 selected in Step S131 to start the latency measurement. The information collector and manager 22 then sends the information on the destination to the GW 12 or virtualization platform 13.

In Step S133, the information measuring unit 123 of the GW 12 measures the latency of the selected GW 12 or virtualization platform 13.

In Step S134, the information measuring unit 123 of the GW 12 sends the measurements to the management server 21.

In Step S135, the information collector and manager 22 of the management server 21 stores the measurements sent in Step S132 in the management tables 51 to 55.

In Step S136, the information collector and manager 22 of the management server 21 determines any GW 12 or virtualization platform 13 remaining for the measurement of latency.

If a GW 12 or virtualization platform 13 remains (YES in Step S136), the process returns to Step S131.

If a GWs 12 or virtualization platforms 13 does not remain (NO in Step S136), the process ends.

Figure 15:
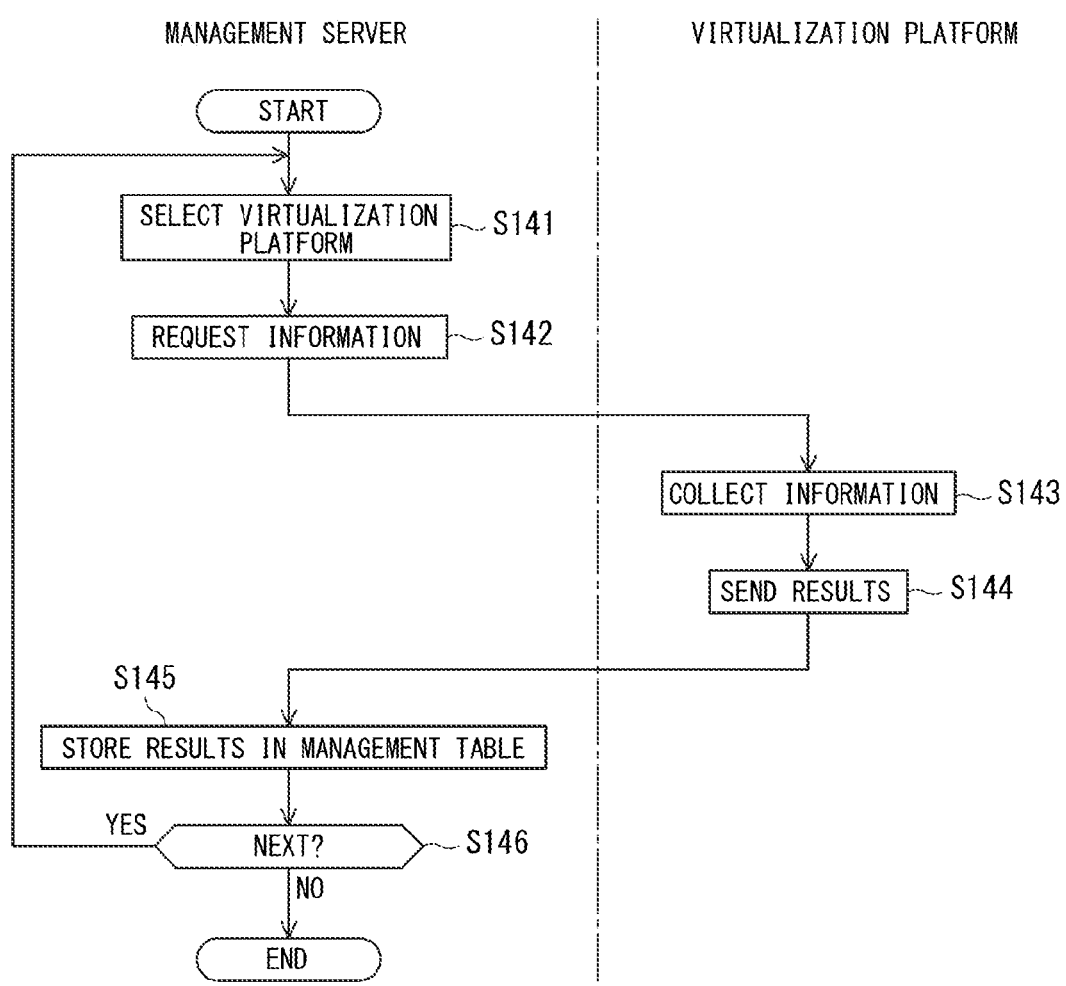
FIG. 15 is a flow chart illustrating an information collection process performed at the information processing system according to an embodiment.

FIG. 15 is a flow chart illustrating an information collection process performed in the information processing system 1 according to an embodiment.

In Step S141, the information collector and manager 22 of the management server 21 selects the virtualization platform 13 for the collection of information.

In Step S142, the information collector and manager 22 of the management server 21 requests information from the virtualization platform 13 selected in Step S141.

In Step S143, the virtualization platform 13 collects the requested information.

In Step S144, the virtualization platform 13 sends the collected information to the management server 21.

In Step S145, the information collector and manager 22 of the management server 21 stores the information sent in Step S142 in the management tables 51 to 55.

In Step S146, the information collector and manager 22 of the management server 21 determines any virtualization platform 13 remaining for the collection of information.

If a virtualization platform 13 remains (YES in Step S146), the process returns to Step S141.

If a virtualization platform 13 does not remain (NO in Step S146), the process ends.

FIGS. 16A to 16C, 17, and 18 illustrate an example process of relay node determination performed in the information processing system 1.

FIGS. 16A to 16C illustrate the relay determination process performed by the relay-node identifier 23 of the management server 21 according to an embodiment.

In the step illustrated in FIG. 16A, the administrator uses the terminal 31 to instruct the management server 21 to hot-migrate a VM-A in Site A to Site C.

The relay-node identifier 23 of the management server 21 refers to the site table 54 to acquire the latency between Sites A and C. If the latency is below a threshold (for example, within 10 ms for VMware vMotion) enabling hot migration, the relay-node identifier 23 determines Site C as the destination. Hereinafter, a threshold of 10 ms will be exemplified.

If the latency exceeds the threshold, the relay-node identifier 23 selects Site D, which "is within 10 ms from Site A" and "has the lowest latency from Site C," as illustrated in FIG. 16B. The relay-node identifier 23 also selects Site E, which "is within 10 ms from Site C" and "has the lowest latency from Site A."

The relay-node identifier 23 refers to the resource information in the management tables 51 to 55 to preferentially select a site having hardware and network resources similar to the destination site.

The relay-node identifier 23 selects a pair of sites having the lowest latency therebetween among Sites D and E and Sites A and C, which were selected above. For example, the latency between Sites D and E may be the lowest.

In such a case, the relay-node identifier 23 repeats the relay node selection process for Sites D and E and finally selects Site F as a relay node, as illustrated n FIG. 16C. In this way, Sites D, E, and F are selected as relay nodes. That is, the sequence of Sites A, D, F, E, and C is selected as the hot migration route.

Figure 17:
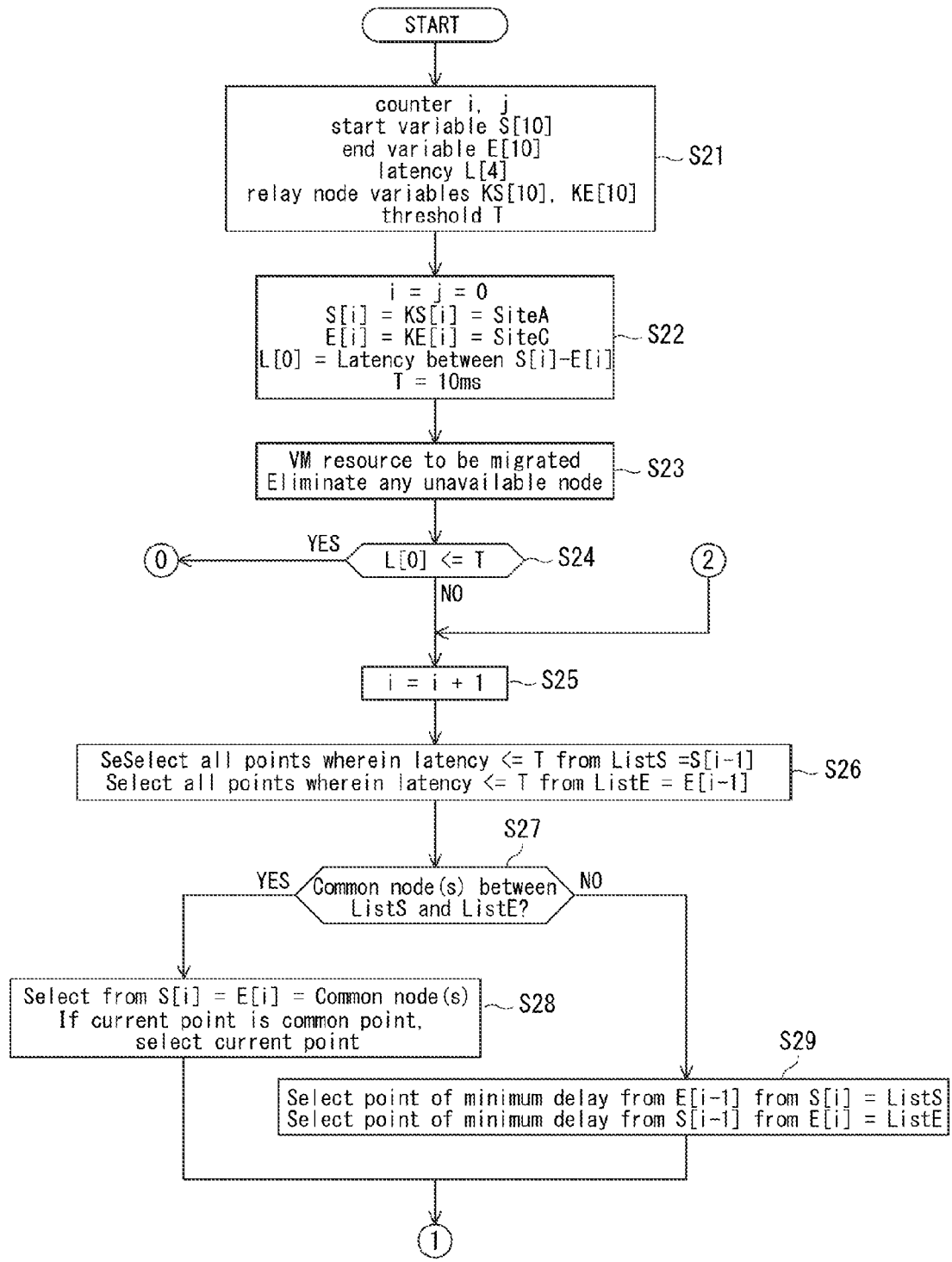
FIG. 17 is a flow chart illustrating the relay node determination process performed at the information processing system according to an embodiment.
Figure 18:
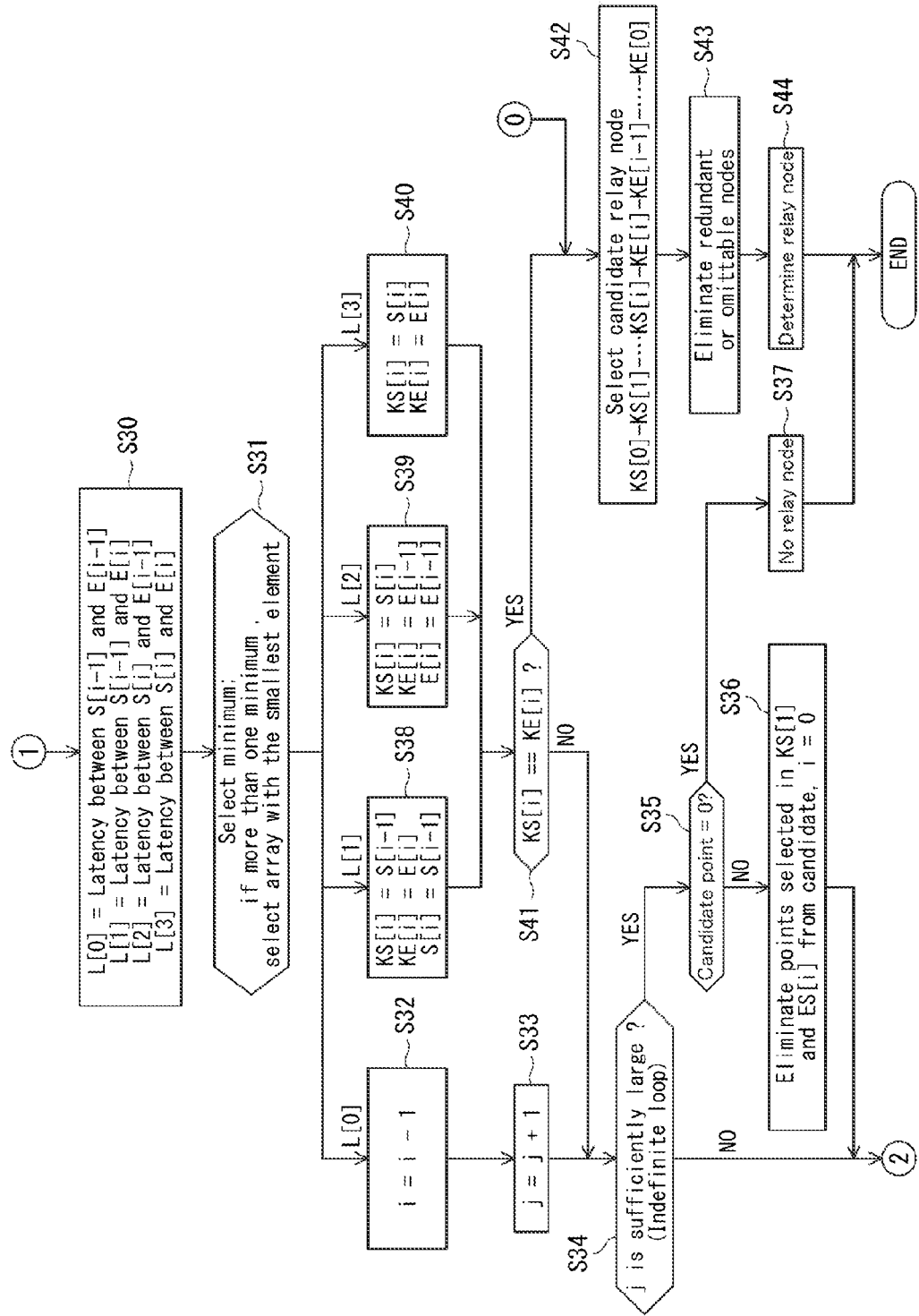
FIG. 18 is a flow chart illustrating the relay node determination process performed at the information processing system according to an embodiment.

FIGS. 17, 18, and 16A to 16C are flow charts illustrating a relay node determination process. FIG. 17 illustrates Steps S21 to S29. FIG. 18 illustrates Steps S30 to S44.

In Step S21, the relay-node identifier 23 establishes, for example, "counter i, j," "start variable S[10]," "end variable E[10]," "latency L[4]," "relay node variable KS[10], KE[10]," and "latency threshold T." The start variable S[10] indicates an array of ten elements. The latency L[4] indicates an array of four elements. The maximum number of elements for the recording of relay nodes is ten. The number of elements may be changed to any number shorter than ten.

In Step S22, the relay-node identifier 23 assigns an initial value to the variable established in Step S21.

In Step S23, the relay-node identifier 23 eliminates the relay sites to which the virtual machine 14 cannot migrate.

In Step S24, the relay-node identifier 23 determines whether the latency L[0] between S[i] and E[i] is lower than or equal to the latency threshold T.

If the latency L[0] is lower than or equal to the latency threshold T (YES in Step S24), the process goes to Step S42 illustrated in FIG. 17.

If the latency L[0] exceeds the latency threshold T (NO in Step S24), the relay-node identifier 23 increments the counter i by one in Step S25.

In Step S26, the relay-node identifier 23 selects sites having a latency within T (ms) from List S=S[i−1]. For example, in the example illustrated in FIG. 16B, Site D is within 10 ms from Site A.

The relay-node identifier 23 also selects sites having a latency within T (ms) from List E=E[i−1]. For example, in the example illustrated in FIG. 16B, Site E is within 10 ms from Site C.

In Step S27, the relay-node identifier 23 determines common sites in Lists S and E.

If common sites exist (YES in Step S27), the relay-node identifier 23 selects a site from the common sites S[i]=E[i] in Step S28. If the common sites include the management server 21 supporting the relay-node identifier 23, the management server 21 is selected.

If no common sites exist (NO in Step S27), the relay-node identifier 23 selects a site that has a low latency from E[i−1] from List S and inserts this to S[i], in Step S29. The relay-node identifier 23 also selects a site that has a low latency from S[i−1] from List E and inserts this to E[i]. For the example illustrated in FIG. 16B, the relay-node identifier 23 establishes S[i]=Site D, S[i−1]=Site A, E[i]=Site E, and E[i−1]=Site C.

In Step S30 illustrated in FIG. 18, the relay-node identifier 23 establishes the latency between S[i−1] and E[i−1] to L[0] and the latency between S[i−1] and E[i] to L[1]. The relay-node identifier 23 also establishes the latency between S[i] and E[i−1] to L[2] and the latency between S[i] and E[i] to L[3]. For the example illustrated in FIG. 16B, the relay-node identifier 23 establishes the latency between Site A and E to L[1], and other latencies are also established in a similar manner.

In Step S31, the relay-node identifier 23 selects the lowest value among L[0] to L[3]. If there is more than one lowest value, the relay-node identifier 23 selects an array having the smallest number of elements.

If L[0] has the smallest number of elements ("L[0]" in Step S31), the relay-node identifier 23 decrements i by one in Step S32, and increments j by one in Step S33.

In Step S34, the relay-node identifier 23 determines whether j is sufficiently large (for example, whether j exceeds a threshold).

If j is insufficiently large (NO in Step S34), the process returns to Step S25 in FIG. 17.

If j is sufficiently large (YES in Step S34), the process may have entered an indefinite loop in which the process of relay node determination is repeated more than predetermined times and/or relay sites that already have been selected are reselected. In Step S35, the relay-node identifier 23 determines the absence of candidate sites.

If a candidate site is determined (NO in Step S35), a site that should have been eliminated, such as a remote site, is retrieved. In Step S36, the relay-node identifier 23 eliminates from the candidate sites selected above for KS[i] and ES[i]. The process then returns to Step S25 in FIG. 17.

If a candidate site is absent (YES in Step S35), the relay-node identifier 23 notifies the administrator of the absence of an appropriate relay site in Step S37. The process then ends.

If L[1] is the lowest in step S31 ("L[1]" in Step S31), the relay-node identifier 23 inserts S[i−1] to KS[i], E[i] to KE[i] and S[i−1] to S[i] in Step S38. The process then goes to Step S41 described below.

If L[2] is the lowest in Step S31 ("L[2]" in Step S31), the relay-node identifier 23 inserts KS[i] to S[i], E[i−1] to KE[i], and E[i−1] to E[i] in Step S39. The process then goes to Step S41.

If L[3] is the lowest in Step S31 ("L[3]" in Step S31), the relay-node identifier 23 inserts S[i] to KS[i] and E[i] into KE[i] in Step S40. The process then goes to Step S41.

In Step S41, the relay-node identifier 23 determines the coincidence of KS[i] and KE[i].

If KS[i] and KE[i] do not coincide (NO in Step S41), the process goes to Step S34.

If KS[i] and KE[i] coincide (YES in Step S41), the relay-node identifier 23 selects KS[0]–KS[1]– . . . –KS[i]–KE[i]–KE[i−1]– . . . –KE[0] as relay node candidates (migration route) in Step S42.

In Step S43, the relay-node identifier 23 eliminates redundant and/or omittable relay node candidates from the relay node candidates selected in Step S42.

In Step S44, the relay-node identifier 23 sends the relay node candidates selected in Step S43 to the administrator.

The relay node determination process illustrated in FIGS. 16A to 16C, 17, and 18 are mere examples. Alternatively, the relay-node identifier 23 may determine the relay nodes through other procedures.

The hot migration process performed in the information processing system will now be described with reference to FIGS. 19 to 21.

Figure 19:
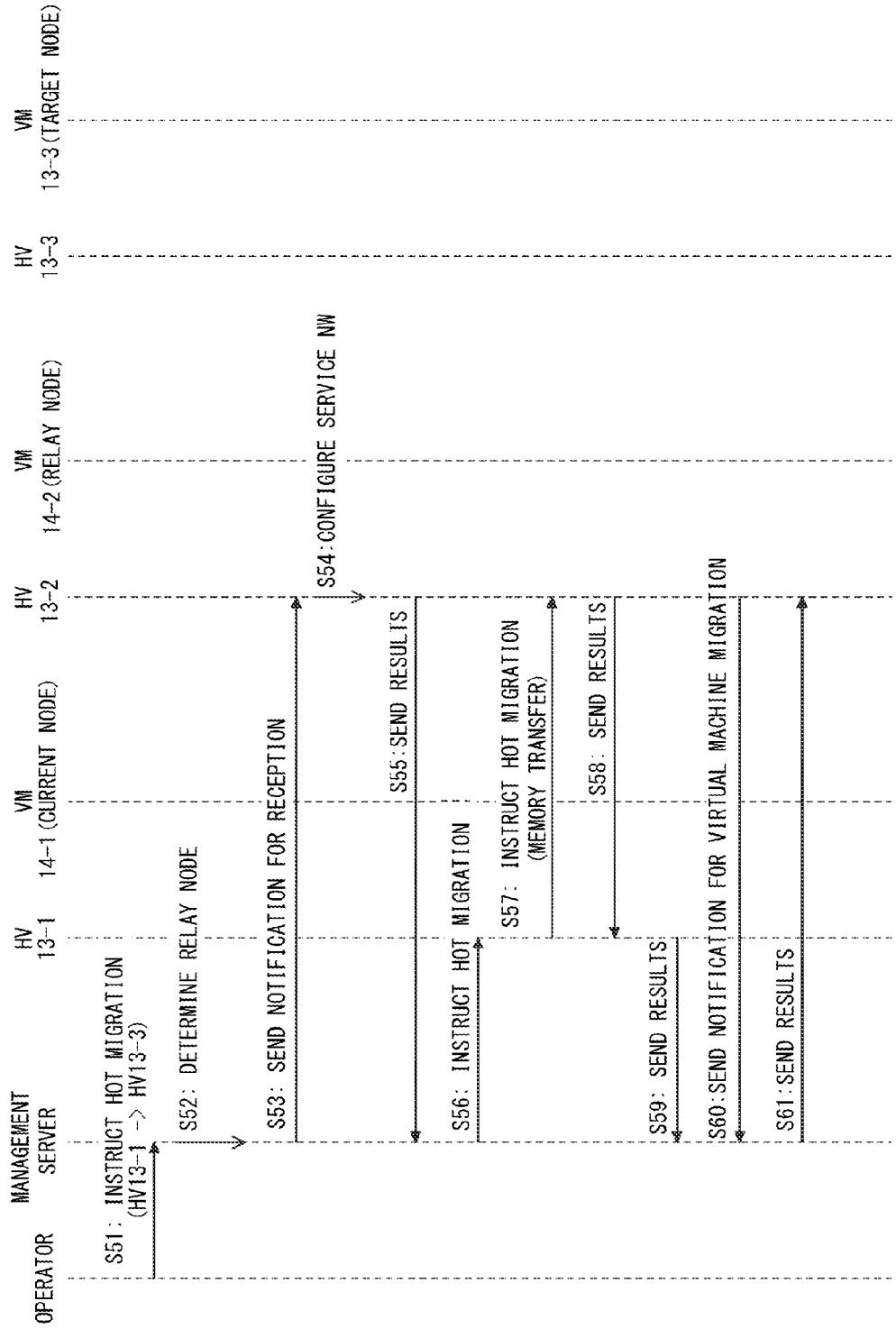
FIG. 19 illustrates the hot migration process performed in the information processing system 1 according to an embodiment.
Figure 20:
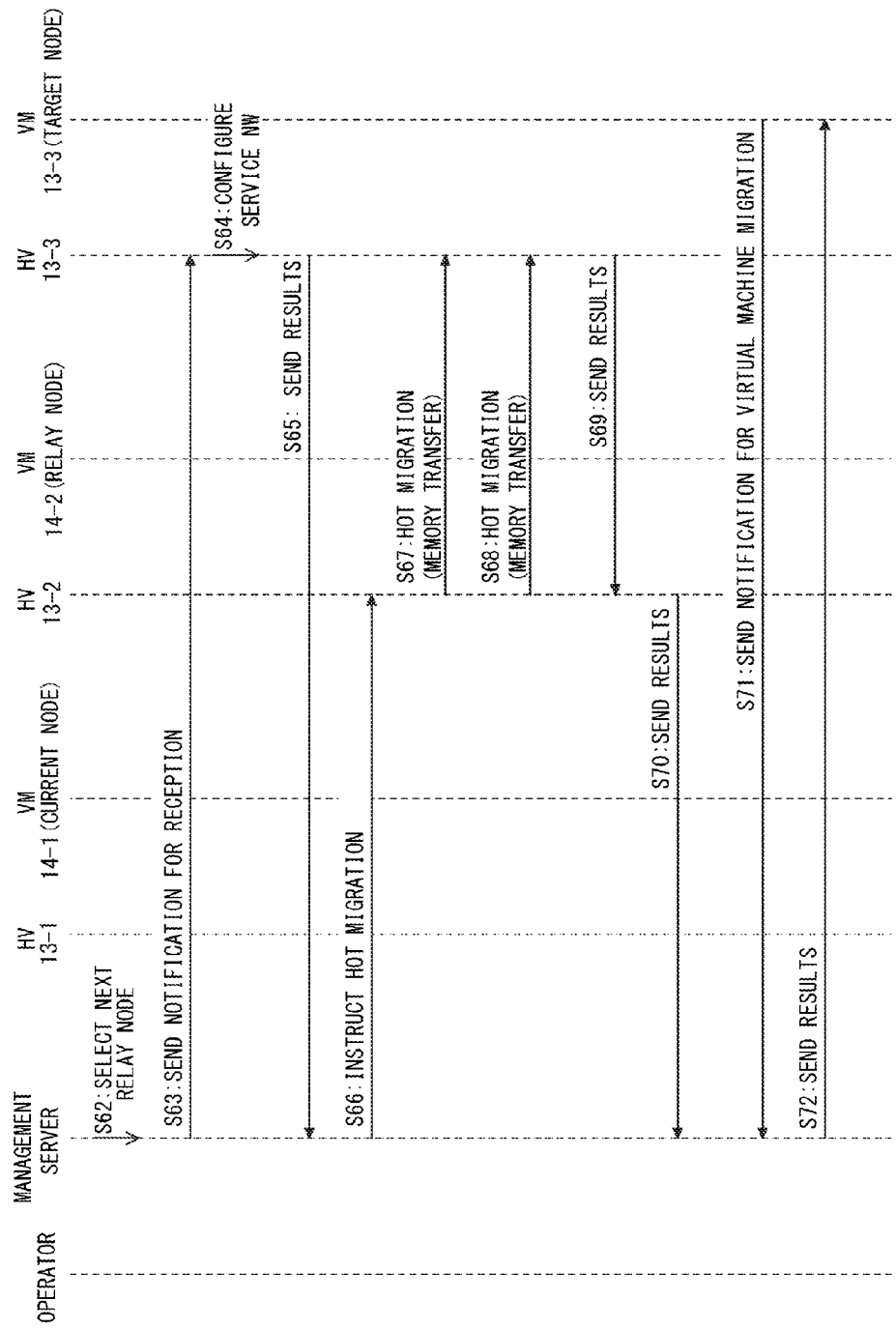
FIG. 20 illustrates the hot migration process performed in the information processing system 1 according to an embodiment.
Figure 21:
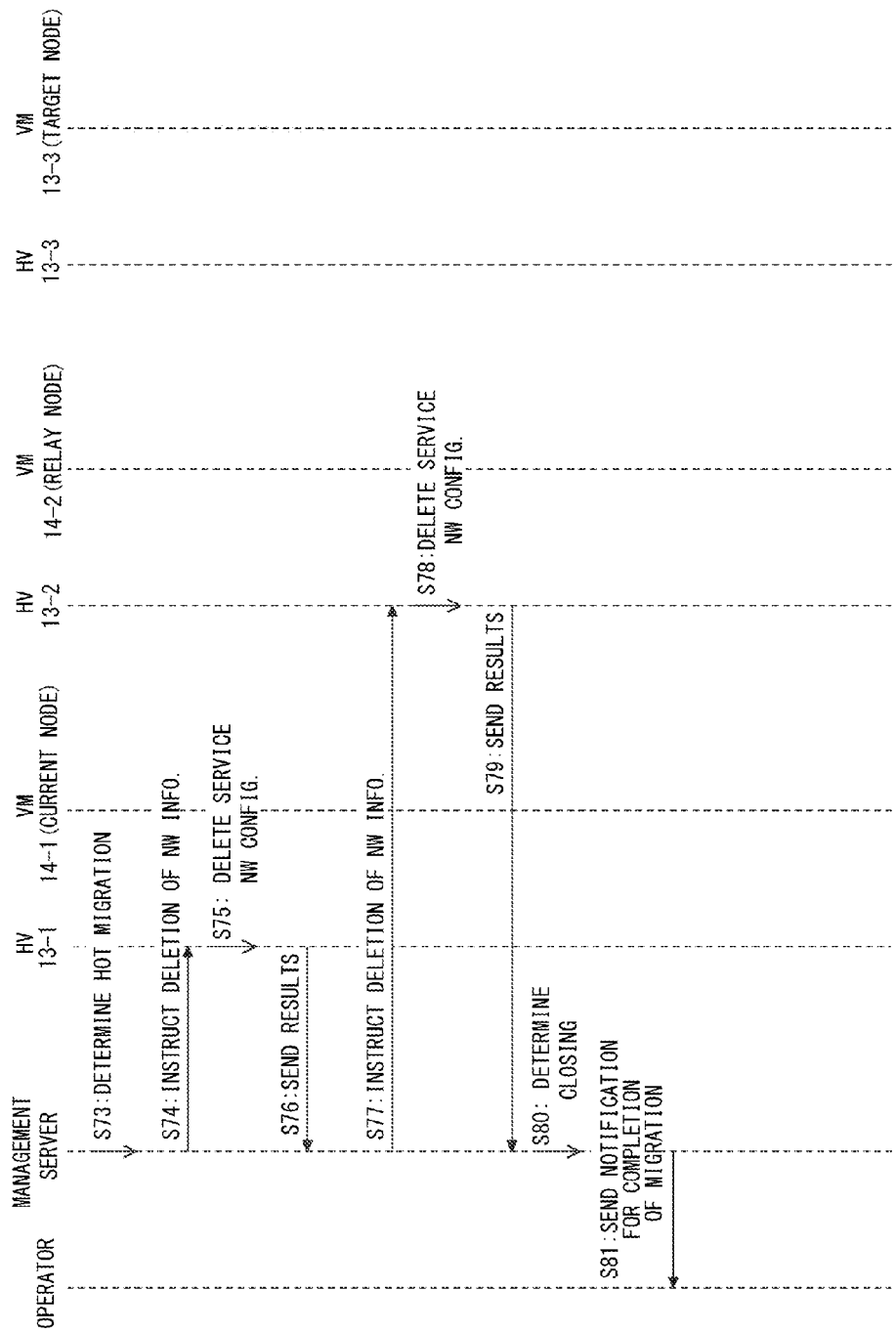
FIG. 21 illustrates the hot migration process performed in the information processing system 1 according to an embodiment.

FIGS. 19 to 21 illustrate the hot migration process performed in the information processing system 1 according to an embodiment. FIG. 19 illustrates Steps S51 to S61, FIG. 20 illustrates Steps S62 to S72, and FIG. 21 illustrates Steps S73 to S81.

In Step S51 illustrated in FIG. 19, the administrator (or operator) instructs the management server 21 to perform hot migration of the virtual machine 14-1 from the virtualization platform 13-1 to the virtualization platform 13-3.

In Step S52, the relay-node identifier 23 of the management server 21 carries out the relay node determination process described above to select the virtualization platform 13-2 as a relay node.

In Step S53, the migration notifier 24 of the management server 21 notifies the virtualization platform 13-2 of the reception of the virtual machine 14.

In Steps S54, the virtualization platform 13-2 establishes a service network in preparation for the reception of the virtual machine 14.

In Step S55, the virtualization platform 13-2 sends the settings of the service network to the management server 21.

In Step S56, the migration notifier 24 of the management server 21 instructs the virtualization platform 13-1 to perform the hot migration.

In Step S57, the virtualization platform 13-1 instructs the virtualization platform 13-2 to perform the hot migration. Memory transfer of the virtual machine 14-1 is performed from the virtualization platform 13-1 to the virtualization platform 13-2.

In Step S58, the event notifier 136 of the virtualization platform 13-2 sends the result of the hot migration to the virtualization platform 13-1.

In Step S59, the virtualization platform 13-1 sends the result of the hot migration to the management server 21.

Upon completion of the hot migration of the virtual machine 14-1, the event notifier 136 of the virtualization platform 13-2 sends the information on the virtual machine 14-2 to the management server 21 in Step S60.

In Step S61, the management server 21 sends a response to the virtualization platform 13-2.

In Step S62, the relay-node identifier 23 of the management server 21 carries out the relay node determination process described above and selects the virtualization platform 13-3 as the final destination.

In Step S63, the migration notifier 24 of the management server 21 sends a notification for the reception of the virtual machine 14 to the virtualization platform 13-3.

In Step S64, the virtualization platform 13-3 establishes the service network in preparation for the reception of the virtual machine 14.

In Step S65, the virtualization platform 13-3 sends the results of the establishment of the service network to the management server 21.

In Step S66, the migration notifier 24 of the management server 21 instructs the virtualization platform 13-2 to perform hot migration.

In Steps S67 and S68, the virtualization platform 13-2 instructs the virtualization platform 13-3 to perform hot migration. Memory transfer of the virtual machine 14-1 is performed from the virtualization platform 13-2 to the virtualization platform 13-3.

In Step S69, the event notifier 136 of the virtualization platform 13-3 sends the result of the hot migration to the virtualization platform 13-2.

In Step S70, the event notifier 136 of the virtualization platform 13-2 sends the result of the hot migration to the management server 21.

Upon completion of the hot migration of the virtual machine 14-1, the event notifier 136 of the virtualization platform 13-3 sends the information on the virtual machine 14-2 to the management server 21 in Step S71.

In Step S72, the management server 21 sends a response to the virtualization platform 13-3. The long-distance hot migration according to this embodiment is then completed.

In Step S73 illustrated in FIG. 21, the management server 21 determines the success of the hot migration.

In Step S74, the management server 21 instructs the virtualization platform 13-1 to eliminate the service network.

In Step S75, the virtualization platform 13-1 eliminates the service network. In Step S76, the virtualization platform 13-1 sends the results of the elimination of the service network to the management server 21.

In Step S77, the management server 21 instructs the virtualization platform 13-2 to eliminate the service network.

In Step S78, the virtualization platform 13-2 eliminates the service network. In Step S79, the virtualization platform 13-2 sends the results of the elimination of the service network to the management server 21.

In Step S80, the management server 21 determines the normal elimination of the service network on the basis of the elimination results sent from the virtualization platforms 13-1 and 13-2 (determination of closing).

In Step S81, the management server 21 notifies the operator of the completion of the hot migration. The management server 21 also sends the result (success/fail) of the hot migration and the result of the closing.

Figure 22:
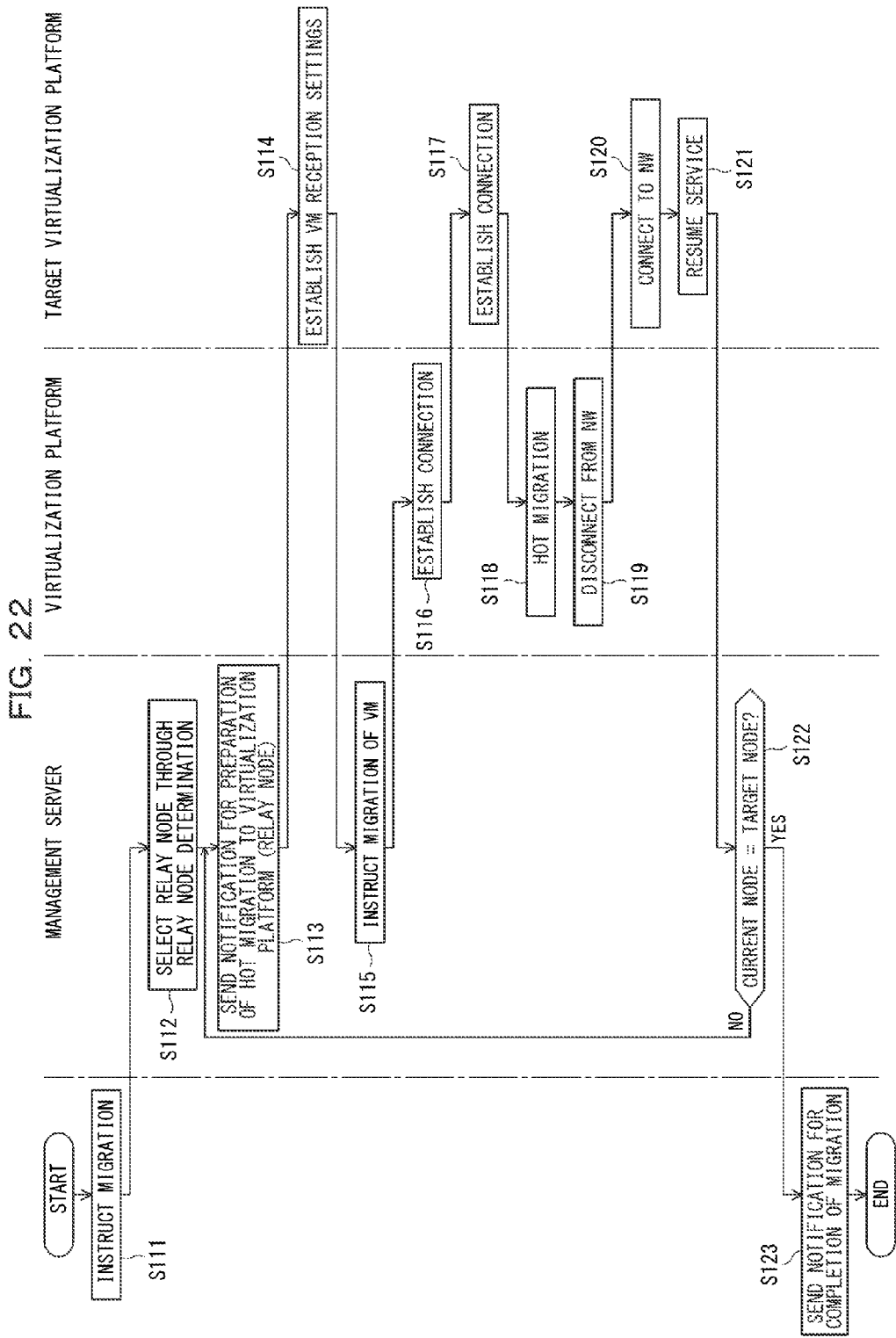
FIG. 22 is a flow chart illustrating a hot migration process performed at the information processing system according to an embodiment.

FIG. 22 is a flow chart illustrating the hot migration process performed in the information processing system 1 according to an embodiment.

In Step S111, the operator instructs the management server 21 to perform hot migration. For instance, an instruction may be issued for the hot migration of the virtual machine 14-1 from the DC 11-1 to the DC 11-3.

In Step S112, the relay-node identifier 23 of the management server 21 carries out the relay node determination process described above to select a relay node. The management server 21, for example, may select the virtualization platform 13-2 of the DC 11-2 as a relay node.

In Step S113, the migration notifier 24 of the management server 21 instructs the virtualization platform 13-2, which is a relay node, to prepare for the reception of the hot migration.

In Step S114, the NW manager 135 of the virtualization platform 13-2, which is a relay node (destination), establishes the network, and the interface unit 133 notifies the management server 21 of the preparation for the hot migration.

Upon reception of the notification, the migration notifier 24 of the management server 21 instructs the source virtualization platform 13-1 to perform the hot migration to the virtualization platform 13-2 in Step S115 (instruction for virtual machine migration).

The NW manager 135 of the virtualization platform 13-1, which has received the instruction, connects to the virtualization platform 13-2 in Steps S116 and S117. In Step S118, the hot migrator 134 of the virtualization platform 13-1 performs the hot migration. The virtual machine 14 in the virtualization platform 13-1 of the DC 11-1 migrates to the virtualization platform 13-2 of the DC 11-2.

Upon completion of the hot migration, the NW manager 135 of the virtualization platform 13-1 disconnects the virtualization platform 13-1 from the network in Step S119.

In Step S120, the NW manager 135 of the virtualization platform 13-2 connects the virtualization platform 13-2 to the network.

In Step S121, the process (service) performed by the virtual machine 14 in the virtualization platform 13-1 resumes at the virtual machine 14 in the virtualization platform 13-2.

Upon reception of the result of the hot migration from the event notifier 136 of the virtualization platform 13-2, the management server 21 determines whether the current node in which the virtual machine 14 exists is the destination in Step S122.

If the current node is not the destination (NO in Step S122), the process returns to Step S113 to instruct the subsequent relay node to prepare for the reception.

If the current node is the destination (YES in Step S122), the virtual machine 14 has reached the destination, and thus the management server 21 sends the result of the hot migration of the virtual machine 14 to the operator in Step S123.

(C) Advantageous Effects

The long-distance hot migration according to an embodiment has a short round-trip delay (latency) and repeats the process of hot migration of the virtual machine 14 to relay nodes that can temporarily support the virtual machine 14. In this way, unlike traditional procedures, hot migration can be performed between sites having a large latency due to, for example, the extended physical distance between the sites.

For example, the long-distance hot migration according to an embodiment achieves migration between remote sites, for example, between Hokkaido and Kyushu and between Japan and a foreign country, that cannot be achieved by traditional hot migration techniques.

The cooperation of the management server interfaces 27 of the management servers 21 enables migration between clouds, such as the Amazon cloud and the Google cloud.

Multiple candidates for a relay node enhance the reliability because if one of the candidates is not available, another candidate can be selected.

(D) Others

The present invention should not be limited to the embodiments described above and may be modified in various ways within the scope of the invention.

For example, the virtual machine 14 is hot-migrated between DCs 11 in the embodiments. Alternatively, the virtual machine 14 may be hot-migrated within a single DC 11 having a large delay time.

In the embodiments, the latency is determined through the use of aping command. Alternatively, the latency may be determined through any other procedure.

In the embodiments, the relay node determination process is performed in accordance with the flow charts illustrated in FIGS. 16A to 16C, 17, and 18. Alternatively, the relay nodes may be determined through another process or the administrator may select, in advance, a migration route including specific relay nodes.

Alternatively, the hot migration according the embodiments may be used in combination with a traditional hot migration process supported by, for example, Cisco® or F5 BIG-IP®.

According to the present invention, long-distance hot migration of virtual machines can be performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A virtual-machine managing apparatus comprising:
a memory that stores delay times between a plurality of managers managing a virtual machine; and
a processor that:
extracts a migration route from a source manager to a target manager based on the delay times between the managers stored in the memory such that the delay times between the managers are equal to or shorter than a threshold; and
migrates the virtual machine from the source manager to the target manager through the migration route while maintaining the operation of the virtual machine,
wherein, when the delay time of the virtual machine between the source manager and the target manager exceeds the threshold, the processor extracts the migration route through at least one route manager by carrying out:
a first process of selecting, among managers being disposed on the migration route between the source manager and the target manager and being included in the plurality of managers, a first route manager that has the delay time from a first manager being equal to or less than the threshold and that has the delay time from the second manager being lowest, and a second route manager that has the delay time from the second manager being equal to or less than the threshold and that has the delay time from the first manager being lowest, the first process being started, regarding the source manager and the target manager as the first manager and the second manager, respectively; and
a second process of replacing the first manager with the first route manager selected in the first process and replacing the second manager with the second route manager selected in the first process,
the first process and the second process being alternately carried out until the first route manager coincides with the second route manager.

2. The virtual-machine managing apparatus according to claim 1, wherein the processor extracts the migration route based on usage resource information on the virtual machine to be migrated.

3. A method of managing a virtual machine by an information processing apparatus comprising a memory and a processor,
wherein the memory that stores delay times between a plurality of managers that manage a virtual machine;
the processor that:
extracts a migration route from a source manager to a target manager based on the delay times between the managers stored in the memory such that the delay time between the managers are equal to or shorter than a threshold; and
migrates the virtual machine from the source manager to the target manager through the migration route while maintaining the operation of the virtual machine, and
when the delay time of the virtual machine between the source manager and the target manager exceeds the threshold, the processor extracts extract the migration route through at least one route manager by carrying out:
a first process of selecting, among managers being disposed on the migration route between the source manager and the target manager and being included in the plurality of managers, a first route manager that has the delay time from a first manager being equal to or less than the threshold and that has the delay time from the second manager being lowest, and a second route manager that has the delay time from the second manager being equal to or less than the threshold and that has the delay time from the first manager being lowest, the first process being started, regarding the source manager and the target manager as the first manager and the second manager, respectively; and a second process of replacing the first manager with the first route manager selected in the first process and replacing the second manager with the second route manager selected in the first process, the first process and the second process being alternately carried out until the first route manager coincides with the second route manager.

4. The method of managing a virtual machine according to claim 3, wherein the processor extracts the migration route based on usage resource information on the virtual machine to be migrated.

5. An information processing system comprising:

a virtual-machine managing apparatus comprising:

a plurality of managers managing a virtual machine;

a memory that stores delay times between the managers; and a processor that:

extracts a migration route from a source manager to a target manager based on the delay times between the managers stored in the memory such that the delay times between the managers are equal to or shorter than a threshold; and migrates the virtual machine from the source manager to the target manager through the migration route while maintaining the operation of the virtual machine, wherein when the delay time of the virtual machine between the source manager and the target manager exceeds the threshold, the processor extracts the migration route through at least one route manage by carrying out:

a first process of selecting, among managers being disposed on the migration route between the source manager and the target manager and being included in the plurality of managers, a first route manager that has the delay time from a first manager being equal to or less than the threshold and that has the delay time from the second manager being lowest, and a second route manager that has the delay time from the second manager being equal to or less than the threshold and that has the delay time from the first manager being lowest, the first process being started, regarding the source manager and the target manager as the first manager and the second manager, respectively; and a second process of replacing the first manager with the first route manager selected in the first process and replacing the second manager with the second route manager selected in the first process, the first process and the second process being alternately carried out until the first route manager coincides with the second route manager.

6. The information processing system according to claim 5, wherein the processor extracts the migration route based on usage resource information on the virtual machine to be migrated.

* * * * *